(12) United States Patent
Fuchs et al.

(10) Patent No.: US 9,402,372 B2
(45) Date of Patent: Aug. 2, 2016

(54) HEIGHT ADJUSTABLE FEEDING TROUGH

(71) Applicant: BIG DUTCHMAN PIG EQUIPMENT GMBH, Vechta-Calveslage (DE)

(72) Inventors: Karsten Fuchs, Essen (DE); Daniel Holling, Berge (DE)

(73) Assignee: BIG DUTCHMAN PIG EQUIPMENT GMBH, Vechta (DE)

( * ) Notice: Subject to any disclaimer, the term of this patent is extended or adjusted under 35 U.S.C. 154(b) by 141 days.

(21) Appl. No.: 14/063,212

(22) Filed: Oct. 25, 2013

(65) Prior Publication Data

US 2014/0116342 A1    May 1, 2014

(30) Foreign Application Priority Data

Oct. 26, 2012    (DE) ..................... 20 2012 010 237 U

(51) Int. Cl.
| | | |
|---|---|---|
| *A01K 1/00* | (2006.01) | |
| *A01K 5/02* | (2006.01) | |
| *A01K 5/01* | (2006.01) | |
| *A01K 7/02* | (2006.01) | |

(52) U.S. Cl.
CPC ... *A01K 5/02* (2013.01); *A01K 5/01* (2013.01); *A01K 7/02* (2013.01)

(58) Field of Classification Search
CPC ........................................................ A01K 5/01
See application file for complete search history.

(56) References Cited

U.S. PATENT DOCUMENTS

| | | |
|---|---|---|
| 45,190 A | 11/1864 | Stellar |
| 48,641 A | 7/1865 | Barnard |
| 138,332 A | 4/1873 | Hughes et al. |
| 138,801 A | 5/1873 | Hall |
| 166,719 A | 8/1875 | Ralph |
| 191,590 A | 6/1877 | Howard |
| 194,819 A | 9/1877 | Hayden et al. |
| 311,880 A | 2/1885 | Doty |
| 366,933 A | 7/1887 | Cowan |
| 396,563 A | 1/1889 | Hawkins |
| 463,857 A | 11/1891 | Crabb |
| 478,402 A | 7/1892 | Chamberlain |

(Continued)

FOREIGN PATENT DOCUMENTS

| | | |
|---|---|---|
| CA | 1129736 | 8/1982 |
| CA | 1172923 | 8/1984 |

(Continued)

OTHER PUBLICATIONS

Crystal Spring Hog Equipment product sheets (undated), Ste Agathe, Canada, Jan. 8, 2016.

(Continued)

*Primary Examiner* — Kristen C Hayes
(74) *Attorney, Agent, or Firm* — Price Heneveld LLP

(57) ABSTRACT

A feeding trough which is accessible to livestock animals is disclosed, and is defined at the bottom and laterally by a bottom wall and side walls, respectively, wherein one of the side walls demarcates the trough interior for an access side from which the animals take up feed from the trough interior. The side wall on the access side has an upper side wall edge over which an animal's head must reach at least partly so that the animal can take up feed from the trough interior and a trough frame to which the feeding trough is fixed. An adjustment mechanism is provided for adjusting the height of the side wall edge on the access side relative to the trough frame.

23 Claims, 16 Drawing Sheets

(56) References Cited

U.S. PATENT DOCUMENTS

| | | | |
|---|---|---|---|
| 489,589 A | 1/1893 | Lewis |
| 545,673 A | 9/1895 | Burke |
| 555,781 A | 3/1896 | Lewis |
| 581,120 A | 4/1897 | Johnson |
| 776,912 A | 12/1904 | Howard |
| 791,171 A | 5/1905 | Washburn |
| 845,982 A | 3/1907 | Smith |
| 846,175 A | 3/1907 | Xevers |
| 947,262 A | 1/1910 | Storelee |
| 978,915 A | 12/1910 | Mastrud |
| 984,890 A | 2/1911 | Taylor |
| 997,248 A | 7/1911 | Freeman |
| 1,138,102 A | 5/1915 | Giltner |
| 1,223,213 A | 7/1917 | Fouts |
| 1,265,025 A | 5/1918 | Aker |
| 1,316,838 A | 9/1919 | Hawkins |
| 1,376,685 A | 5/1921 | Easter |
| 1,469,677 A | 10/1923 | Naylor |
| 1,836,274 A | 12/1931 | Norton |
| 1,919,587 A | 7/1933 | Einsel et al. |
| 2,660,149 A | 11/1953 | Jolly |
| 2,661,720 A | 12/1953 | Rysdon et al. |
| 2,787,404 A | 4/1957 | Vandenberg et al. |
| 2,808,028 A | 10/1957 | Landgraf |
| 2,933,064 A | 4/1960 | Geerings |
| 2,941,506 A | 6/1960 | Fulton |
| 3,050,030 A | 8/1962 | Grundmeier |
| 3,066,649 A | 12/1962 | Geerlings |
| 3,102,511 A | 9/1963 | Atcheson |
| 3,234,911 A | 2/1966 | Chubbuck |
| 3,270,857 A | 9/1966 | Wilkes et al. |
| 3,276,567 A | 10/1966 | Hartman |
| 3,312,328 A | 4/1967 | Carpenter |
| 3,320,930 A | 5/1967 | Pockman et al. |
| 3,394,681 A | 7/1968 | Rigterink et al. |
| 3,602,195 A | 8/1971 | Blough |
| 3,827,405 A | 8/1974 | Allen |
| 3,866,576 A | 2/1975 | Downing |
| 3,911,868 A | 10/1975 | Brembeck |
| 4,070,990 A | 1/1978 | Swartzendruber |
| 4,180,014 A | 12/1979 | Mathews |
| 4,278,049 A | 7/1981 | Van Dusseldorp |
| 4,315,484 A | 2/1982 | Kingery |
| 4,380,214 A | 4/1983 | Williams |
| 4,401,056 A | 8/1983 | Cody et al. |
| RE31,939 E | 7/1985 | Van Dusseldorp |
| 4,660,508 A | 4/1987 | Kleinsasser et al. |
| 4,947,798 A | 8/1990 | De Wispelaere |
| 4,949,676 A | 8/1990 | Burns |
| 4,995,343 A | 2/1991 | Cole et al. |
| 5,010,849 A | 4/1991 | Kleinsasser |
| 5,036,798 A | 8/1991 | King |
| 5,044,318 A | 9/1991 | Sutton et al. |
| 5,069,164 A | 12/1991 | Wiwi |
| 5,222,460 A | 6/1993 | Evans, III |
| 5,272,998 A | 12/1993 | Pannier et al. |
| 5,345,894 A | 9/1994 | Evans, III et al. |
| 5,351,649 A | 10/1994 | Rovira Badia et al. |
| 5,406,907 A | 4/1995 | Hart |
| 5,558,039 A | 9/1996 | Zimmerman |
| 5,570,656 A | 11/1996 | Waldner et al. |
| 5,603,285 A | 2/1997 | Kleinsasser |
| 5,640,926 A | 6/1997 | Kleinsasser |
| 5,921,200 A | 7/1999 | Bondarenko et al. |
| 6,253,705 B1 | 7/2001 | Pollock |
| 6,269,770 B1 | 8/2001 | Bondarenko et al. |
| 6,330,867 B1 | 12/2001 | Rasmussen |
| 6,526,913 B2 | 3/2003 | Bondarenko et al. |
| 6,536,373 B1 | 3/2003 | Bondarenko et al. |
| 6,637,368 B2 | 10/2003 | Bondarenko et al. |
| 6,766,765 B2 | 7/2004 | Bondarenko et al. |
| 6,923,142 B2 | 8/2005 | Kleinsasser |
| 6,976,450 B2 | 12/2005 | Bondarenko et al. |
| 7,134,402 B2 | 11/2006 | Bondarenko et al. |
| 7,278,371 B1 | 10/2007 | Lato |
| 7,530,328 B2 | 5/2009 | Bondarenko et al. |
| 7,975,648 B2 | 7/2011 | Kleinsasser |
| 2005/0132967 A1 | 6/2005 | Kleinsasser |
| 2006/0032449 A1 | 2/2006 | Bondarenko et al. |
| 2008/0276873 A1 | 11/2008 | Waldner et al. |
| 2009/0223457 A1 | 9/2009 | Bondarenko et al. |
| 2010/0229799 A1 | 9/2010 | Brehmer et al. |

FOREIGN PATENT DOCUMENTS

| | | |
|---|---|---|
| CA | 2559967 | 9/1998 |
| CA | 2236017 | 11/1998 |
| DE | 2158285 | 5/1973 |
| DE | 137875 | 3/1979 |
| DE | 8002617 | 2/1980 |
| DE | 214755 | 10/1984 |
| DE | 10332391 | 2/2005 |
| DE | 102004037744 | 3/2006 |
| DE | 60301958 | 7/2006 |
| DE | 102008038892 | 2/2010 |
| DE | 202010007723 | 11/2011 |
| DE | 202012004008 | 8/2012 |
| DE | 202012000058 | 5/2013 |
| DE | 102013210938 | 12/2013 |
| FR | 2565462 | 12/1985 |
| GB | 936653 | 9/1963 |
| GB | 1422954 | 7/1973 |
| GB | 1482339 | 11/1975 |
| GB | 2369033 | 5/2002 |

OTHER PUBLICATIONS

Chore-Time Generation 4(tm) Dry Feeders product sheet (undated), www.ctbinc.com, Jan. 8, 2016.

Brower's Lo-Boy, Ez-Just, Better-Built Hog Equipment product sheet (No. 7612), Brower, Quincy, Illinois, Jan. 8, 2016.

Pride of the Farm, Automatic Waterers and Feeders product brochure (1967) Hawkeye Steel Products, Inc., Waterloo, Iowa.

M. Brumm, J. Dahlquist, Nebraska Swine Reports, "Impact of Feeder and Drinker Designs on Pig Performance, Water Use and Manure Production," University of Nebraska—Lincoln, Animal Science Department (1997).

Shenandoah, Chromized Steel Hog Feeders product sheet (undated), Jan. 8, 2016.

Osborne Industries Inc., Osborne Feeders product sheet (undated), Jan. 8, 2016.

WLC Company, Inc., hog feeder product sheets (Oct. 12, 1988).

Ideal, Stainless Steel Confinement Feeders product sheet (undated), Jefferson, Iowa, Jan. 8, 2016.

Modern Hog Concepts, Round (Feed-Saver) Hole Stainless Steel Feeders product sheet (undated), Iowa, Jan. 8, 2016.

Schouten Feeders Inc., The Feed Saver product sheet (undated), Caledonia, Ontario, Jan. 8, 2016.

Marling Mfg. Inc., Smidley feeders product sheets (undated), Iowa, Jan. 8, 2016.

Werk Weld Inc., Creep Feeder product sheets (undated), Armour, South Dakota, Jan. 8, 2016.

Crystal Spring Hog Equipment, N3 dry nursery feeder product sheets (undated), Ste Agathe, Canada, Jan. 8, 2016.

History of Hawkeye Steel Products Inc., Jan. 8, 2016.

Hawkeye Steel Products, Inc., Adjustomatic Capacity Feeder product sheets (undated), Waterloo, Iowa, Jan. 8, 2016.

Brower, Lo-Boy E-Z Just product sheet (undated), Quincy, Illinois, Jan. 8, 2016.

Hawkeye Steel Products, Automatic Waterers and Feeders product line (1967), Waterloo, Iowa.

Pax Steer Feeder product sheets (undated), Jan. 8, 2016.

Pride of the Farm, Rectangular Penline Hog Feeders product sheets (undated) Hawkeye Steel Products, Inc., Waterloo, Iowa, Jan. 8, 2016.

Pride of the Farm, Perma-Pride Hog Feeders product sheet (undated) Hawkeye Steel Products, Inc., Waterloo, Iowa, Jan. 8, 2016.

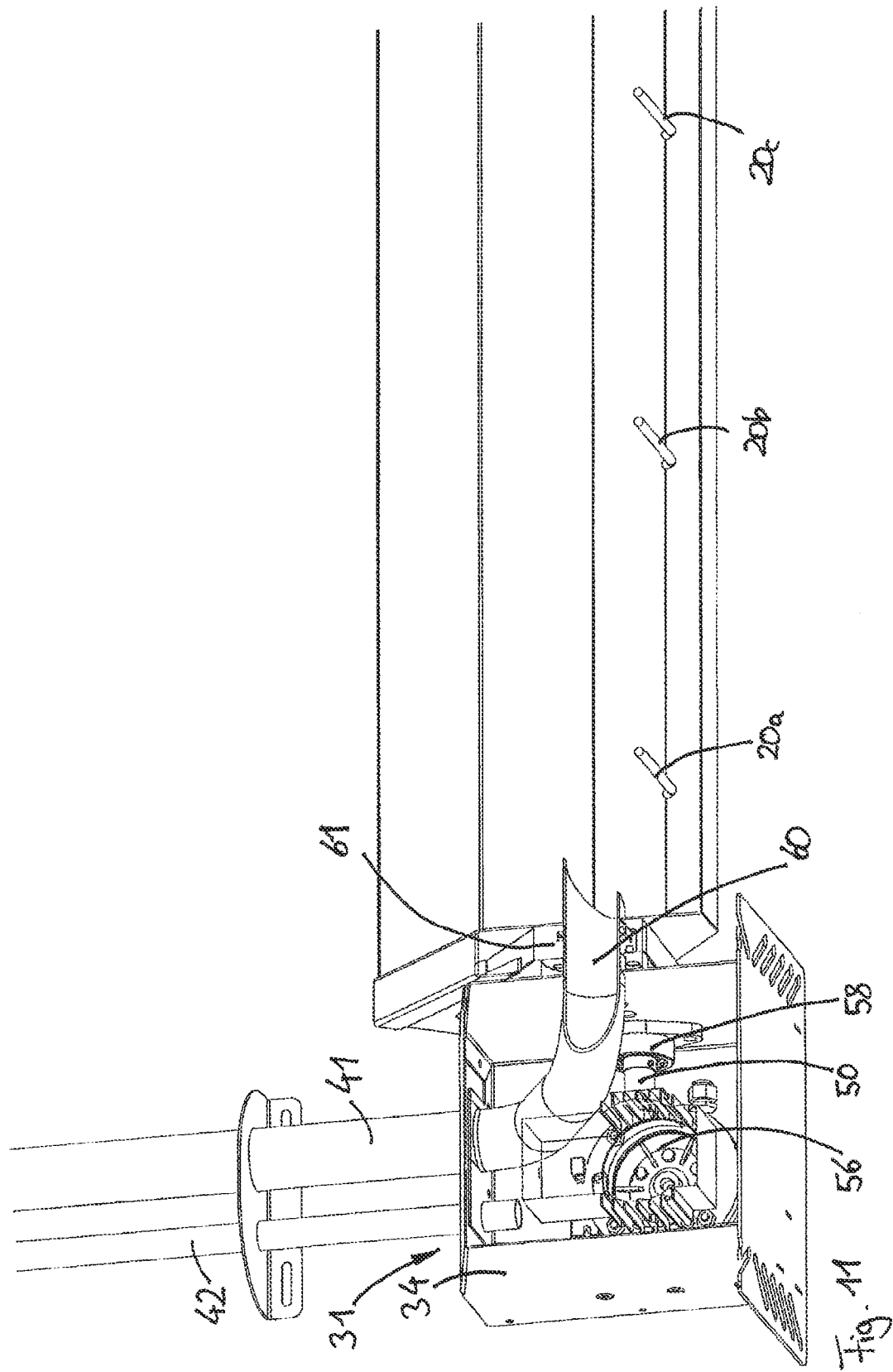

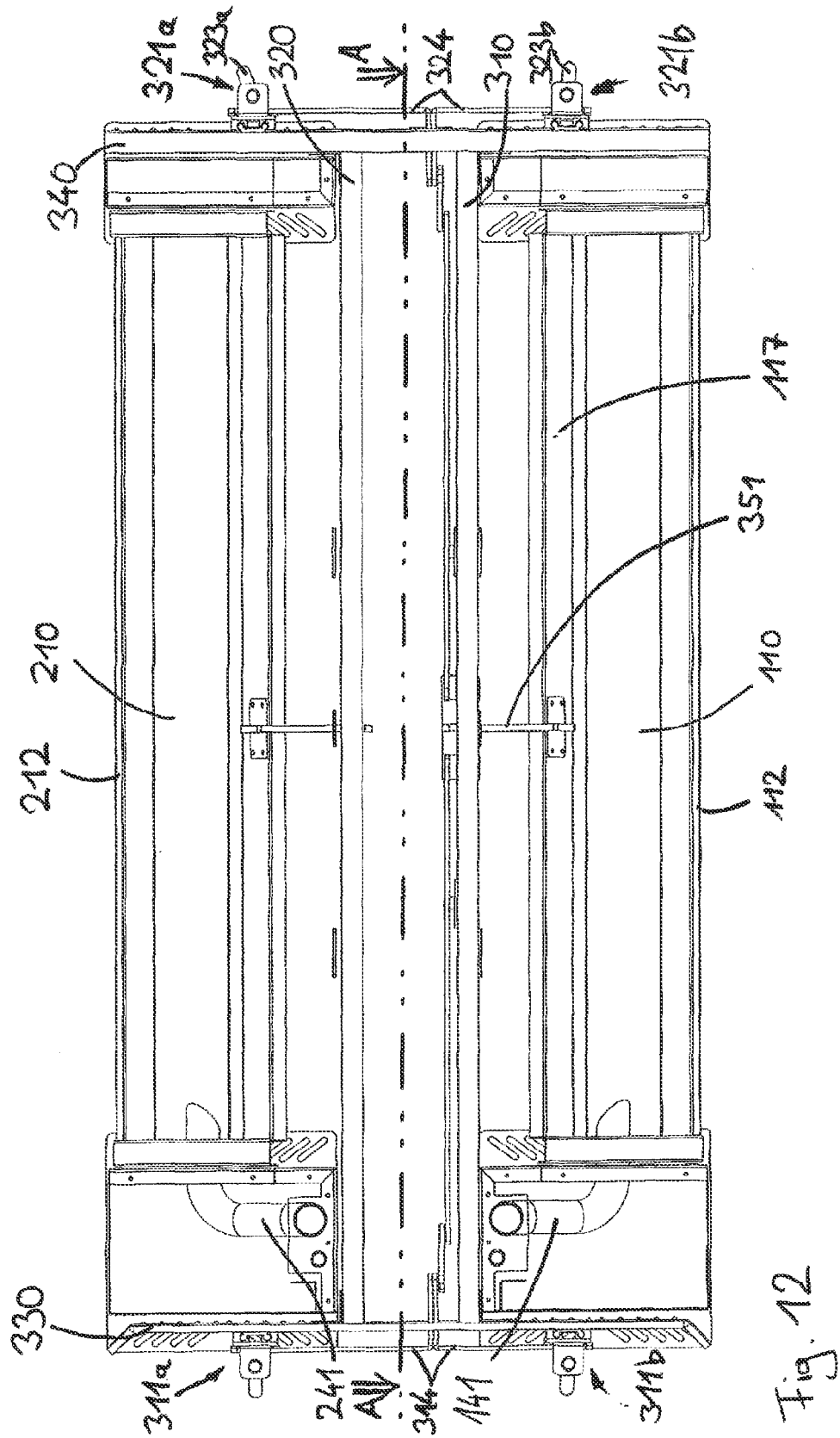

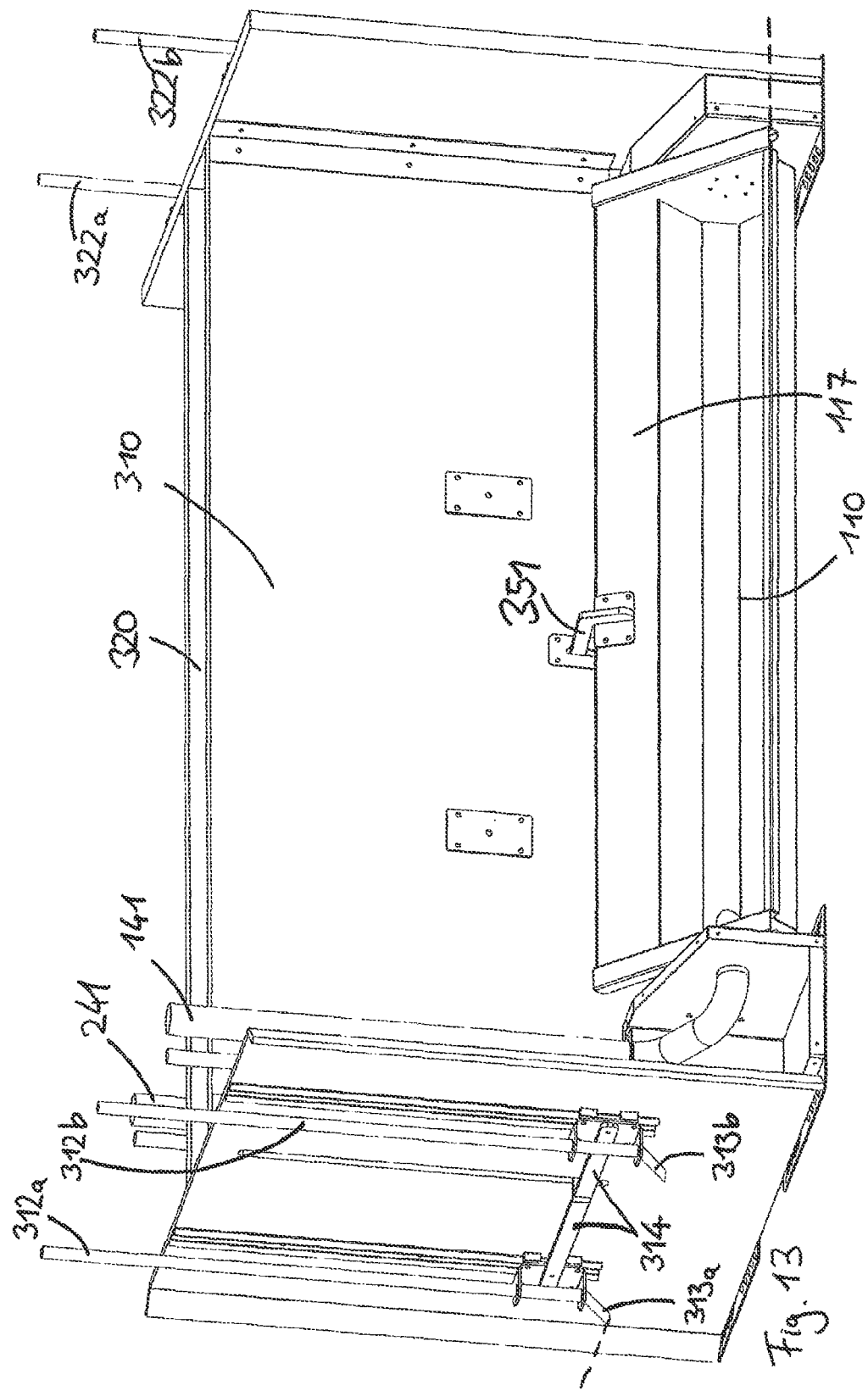

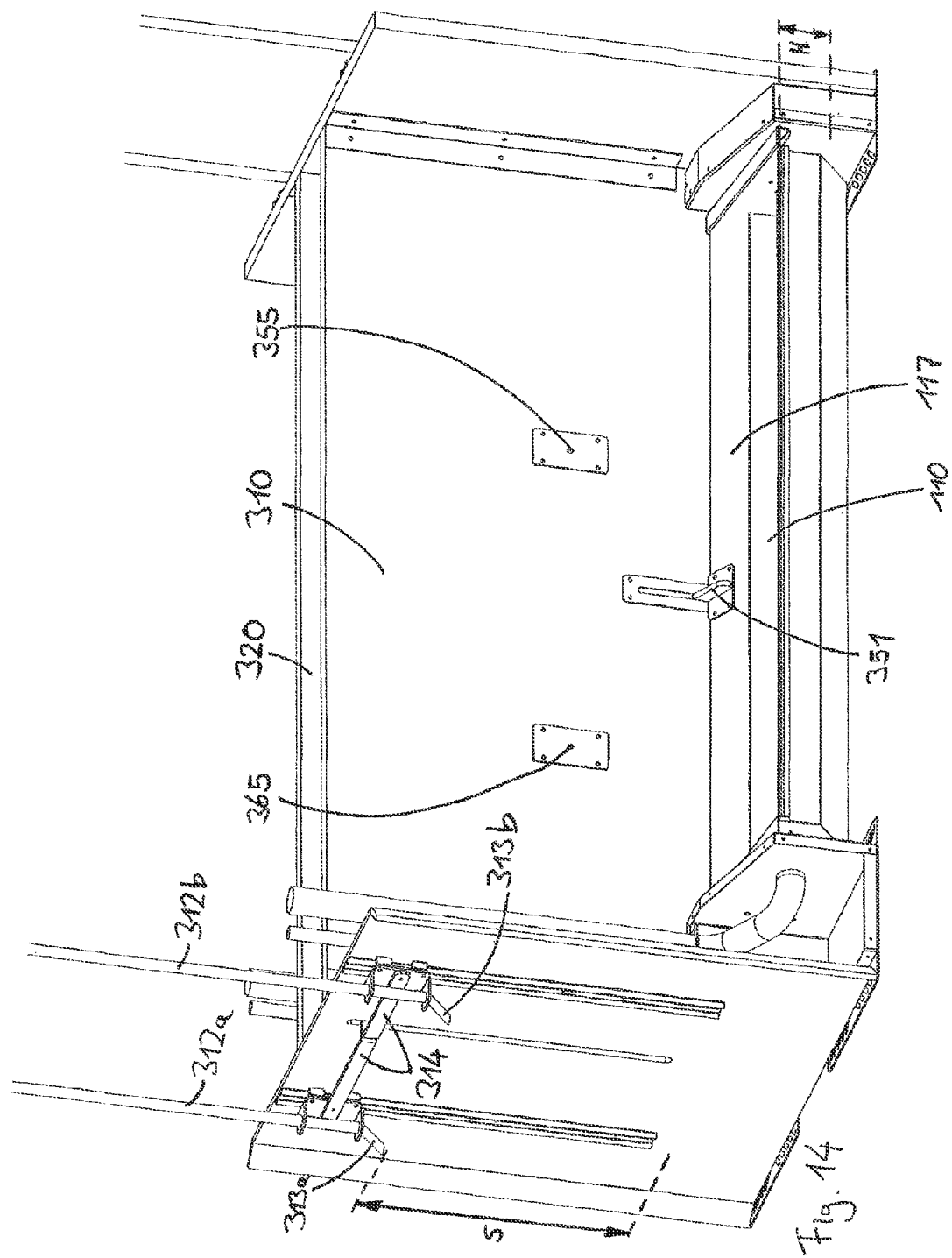

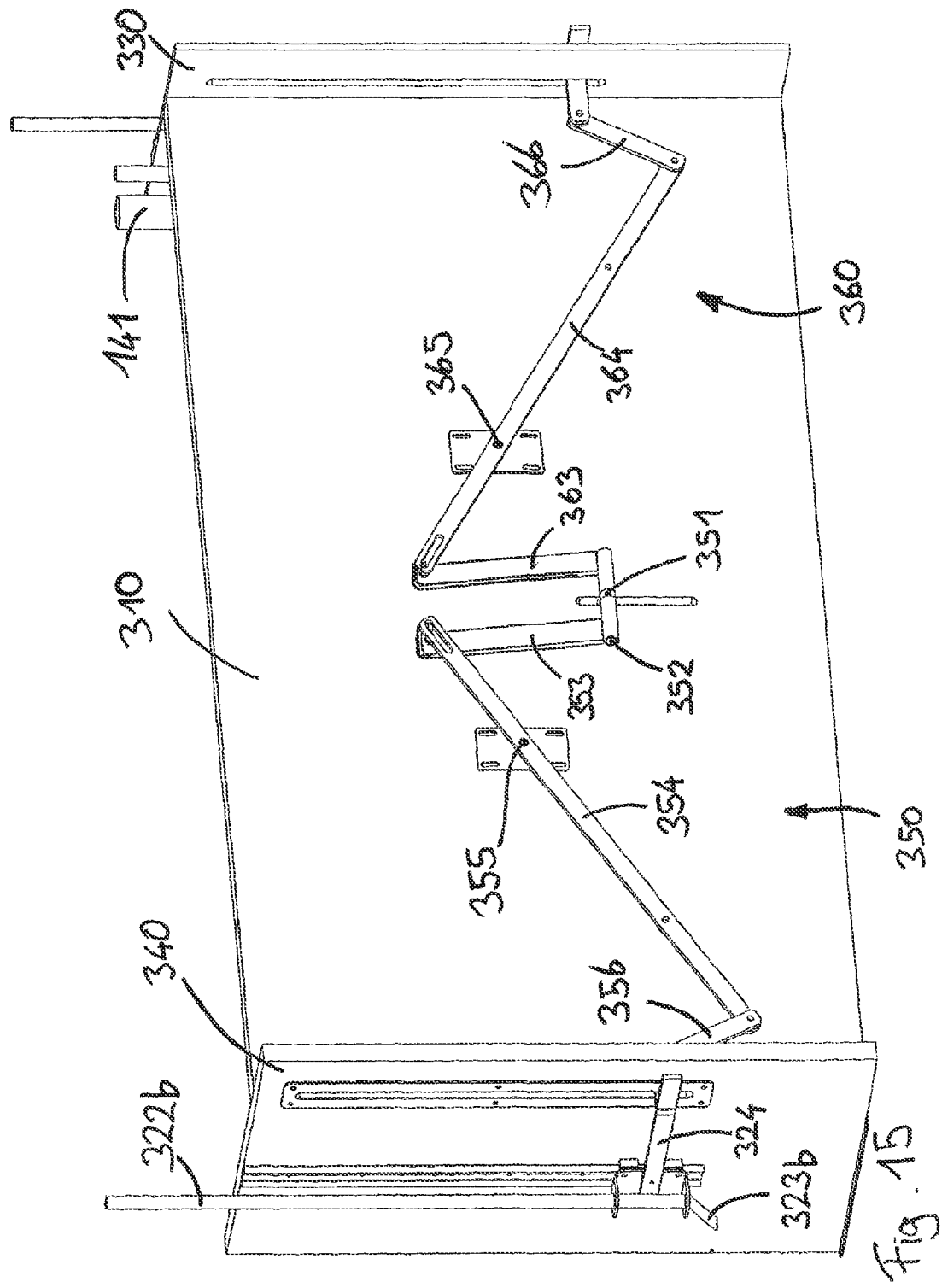

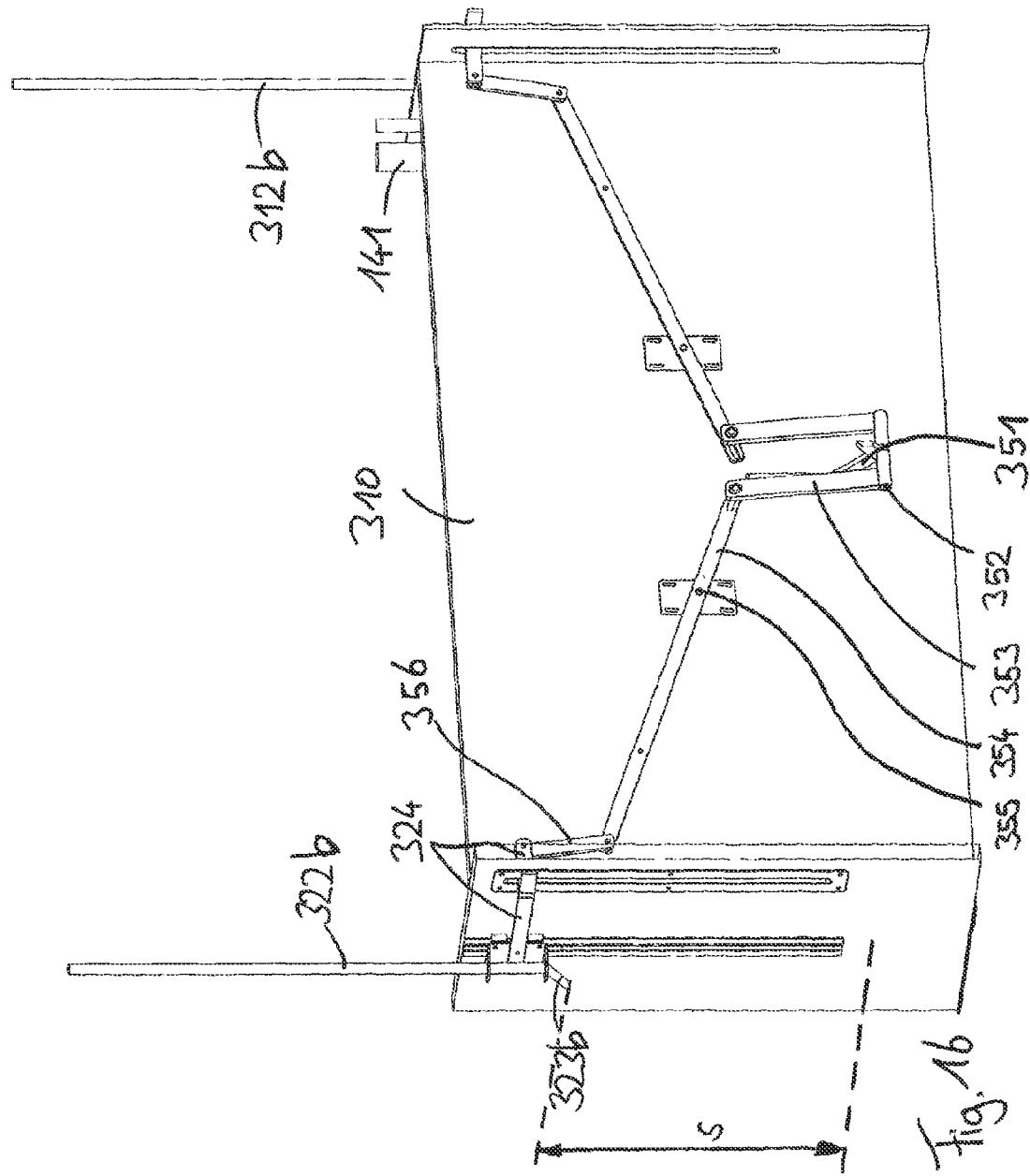

HEIGHT ADJUSTABLE FEEDING TROUGH

CROSS REFERENCE TO FOREIGN PRIORITY APPLICATION

The present application claims the benefit under 35 U.S.C. §119(b) of German Application No. 20 2012 010 237.0, filed Oct. 26, 2012, entitled "Height-Adjustable Feeding Trough."

FIELD OF THE INVENTION

The invention relates to the field of concepts for the keeping of livestock, in particular, a height-adjustable feeding trough for pig farming.

BACKGROUND OF THE INVENTION

In present-day concepts for the keeping of livestock, animals are reared and kept from a young age (e.g. as piglets) until they are fully-grown adults (e.g. as sows or boars), in such a way that the animals are kept in the appropriate environment for their respective age and size. This is advantageous for species-appropriate keeping of the animals in the respective age and for healthy livestock, is prescribed by statutory regulations in some countries and is conducive to the growth of the animals. The environmental conditions which are striven for or required in this regard are manifold and depend, inter alia, on the species concerned, on the climate, the country and on husbandry practices.

Critical parameters for the rearing of livestock may include, for example, the characteristics of the floor on which the animals are kept, the type and number of the supply devices, such as feed and liquid uptake devices inside the pen, the ratio of ranging areas on natural ground to the area inside the pen, the design of particular areas such as rest zones, play zones and the like for the animals, as well as broader parameters such as air conditioning parameters, for example temperature, air flow, air changes, or, for example, the size of groups in which animals are collectively kept.

One important factor in concepts for the keeping of growing animals is that of the floor area aimed at for each animal in a pen, in order to ensure a healthy way of keeping the animals, or which must be maintained due to statutory stipulations. For many livestock species, this floor area is made dependent on the size and/or the age and/or the weight of the animals and is typically classified according to certain limit values. One aim in pig rearing, for example, is that the animals have a floor area of 0.15 square meters per animal in the pen when they are in piglet age and weigh between 5 and 10 kg, and that this area is increased according to weight in a series of steps, so that, for example, a floor area of 0.75 square meters per animal is required when they weigh between 50 and 110 kg, with a further increase to 1 square meter per animal being striven for when they exceed 110 kg in weight. Many countries have respective regulations for livestock farming that prescribe these or other limit values that must be complied with by every livestock farmer.

Moving the livestock animals from a first pen section to a second pen section in order to comply with target conditions is known from the prior art. This concept for keeping or rearing livestock allows the first pen area to be designed for young animals, for example by equipping it with appropriate supply devices, play zones and the like, and designing the second, larger pen area accordingly for larger or fully-grown animals.

In this prior art approach to livestock rearing, it is common practice to adapt the first and second pen areas to the size of the animals or to the area that the animals need. In the first pen area, a smaller area per animal than in the second pen area is generally provided, due to the animals being smaller in size and lower in weight. This can help achieve a basically efficient way of using the entire pen area.

In present-day livestock farming, one aim in the case of animals that live in groups is that groups originally formed when the animals are young be recomposed as little as possible in the course of rearing, in order to prevent new hierarchies being formed as a result, and thus to prevent the associated stress to which the animals are exposed. In such cases, one disadvantage of the prior art concept for keeping livestock during rearing, with two or three pen areas for the different size or weight categories of the animals, is that pen areas specifically adapted to the respective group must be kept available in order to adapt to the spatial requirements of the group in the respective growth phase. While it is possible with pens that are subdivided in this way to achieve efficient use of all the pen areas at every moment of the rearing process by systematic pen management in large fattening farms, when animals are continuously reared and kept in the respective age groups, it has been found, however, that this prior art concept for keeping animals often fails to achieve efficient use of the entire pen area, particularly when the aim is to avoid splitting existing groups of animals, and precisely in the case of smaller numbers of animals, and that when larger numbers of animals are involved, such efficient use is not possible in some cases or can only be achieved with substantial planning and repenning effort.

The object of the invention is to allow more efficient use of pen areas in association with present-day concepts for keeping and rearing livestock. According to the invention, this object is achieved by a novel feeding trough apparatus for the animals, said feeding trough apparatus comprising a feeding trough having a trough interior which is accessible to the livestock and which is defined at the bottom and laterally by a bottom wall and side walls, respectively, wherein one of the side walk demarcates the trough interior for an access side from which the animals can take up feed from the trough interior through a trough opening, said side wall on the access side having an upper side wall edge over which an animal's head must reach at least partly so that the animal can take up feed from the trough interior, and a trough frame to which the feeding trough is fixed, said feeding trough apparatus being characterised by an adjustment mechanism for adjusting the height of the side wall edge on the access side relative to the trough frame.

SUMMARY OF THE INVENTION

According to the invention, a feeding trough apparatus is provided which allows a more flexible and cost-efficient concept for keeping livestock in livestock pens. The invention allows keeping a group of livestock animals in a pen and dispensing with the need to repen the entire group or to split the group into subgroups, and hence with the associated stress on the livestock and the additional effort involved for the keeper of livestock. Instead, it is possible with the invention to enlarge the pen area in which the animals are kept as the animals increase in weight or size, for example by removing or repositioning partition walls or the like. This is achieved by allowing the feeding device in the pen area to be used not only for young animals but also for adults, as a result of which it is no longer necessary, according to the invention, to provide different feeding devices for young animals and adult animals. The invention is based on the realisation that an efficient concept for keeping growing livestock in pens can be implemented for a group of animals with little stress when the animals can be kept for as long a period as possible in one and the same pen area and that cost-efficient use of the pen area can be simplified logistically by this option of having a given pen area occupied permanently by one group of livestock animals.

According to the invention, a feeding trough apparatus comprising a feeding trough and a trough frame is provided. The trough frame may typically be a frame to be anchored on the pen floor and which can receive the feeding trough at two opposite ends, for example. Alternatively, however, the invention may also include other concepts for the trough frame, for example trough frames which extend downwards from a ceiling or from a holding structure arranged above the feeding trough, or a central trough frame from which one, two or more feeding troughs extend laterally. The trough frame may basically be provided by two or more separate frame members, or by a single contiguous frame member.

The feeding trough according to the invention has a trough interior which is bounded at the bottom and laterally by a bottom wall and side walls, respectively, such that the feed can be received therein and taken up by the animals. It should be understood in this regard that the geometrical configurations of the side walls and the floor of the feeding trough are not an essential property for the invention, and that dome-shaped walls and floors as well as planar wall and floor surfaces that are folded together, welded together or otherwise joined to each other are covered by the invention. A bottom wall is understood in this sense to be any wall surface that substantially demarcates the bottom of the trough interior, and a side wall is understood to be any wall surface that substantially demarcates the trough interior laterally. It is also possible, according to the invention and as described below, that a wall surface can also perform the function of a bottom wall in one position and the function of a side wall in a different position, depending on adjustment of the feeding trough.

The feeding trough according to the invention has a side wall edge on the access side. The feeding trough according to the invention may basically be used by the animals from one, two or more sides, use being understood in this regard to mean that it is possible for the animals to take up feed from the trough interior from the respective access side. The side wall edge on the respective access side of the feeding trough is the upper demarcation of the side wall, over which the animals must stretch their heads at least partially in order to reach the feed from the trough interior. The invention is based on the realisation that the latter side wall edge is a characteristic feature for adjusting a feeding device to the size of the animal. The height of the side wall edge is to be understood in this regard as the distance between the side wall edge and the floor area on which the livestock animals stand on the access side, i.e. typically the pen floor area.

Side wall edge heights adapted to adult animals cannot generally be reached or overcome by young animals, so feeding devices that are designed for adult animals are not suitable for feeding young animals as well. In contrast, feeding devices which have a low side wall edge and which can therefore be used by young animals cannot generally be filled with feed to a sufficiently high level inside the trough interior to allow adult animals to take up feed in accordance with their age. In such a case, the adult animals generally have to bend down too far in order to reach the feed. Furthermore, when the feeding trough edges are low and such feeding troughs are used by adult animals, the feeding trough interior becomes increasingly contaminated due to dirt entering from the outside, and feed is lost due to feed being carried out of the feeding trough to the outside in the course of feeding, which has disadvantageous effects on hygiene and cost efficiency.

According to the invention, the side wall edge of the inventive feeding trough apparatus can be adjusted in its height relative to the trough frame by means of an adjustment mechanism. The height of the side wall edge relative to the pen floor in the access area can be changed in this way, and more particularly it can be lowered for use by young animals and raised for use by adult animals.

This height adjustment can be achieved by adjusting the height of the entire feeding trough, i.e. raising or lowering all the edges of the feeding trough and also of the floor and the side walls. Alternatively to, or in combination with the latter, however, it is also possible to adjust only the side wall itself or only one side wall section in order to realise the feeding trough according to the invention, and it is also possible, alternatively or additionally, to adjust the feeding trough in its position relative to the trough frame in such a way that the adjustment mechanism causes a movement of the feeding trough in the form of a pivoting movement, a movement along a curved or straight path of motion, or a combination thereof, in connection with which the height of the side wall edge on the access side is adjusted.

It is possible with the invention to adjust the feeding trough apparatus to the size and/or the weight of the animals, thus allowing livestock in a group to be kept from the beginning of rearing until they reach an adult age in one and the same pen area in which the feeding trough apparatus is placed, and to feed themselves throughout the entire rearing period from the feeding trough apparatus according to the invention. This allows modern forms of livestock farming to be implemented in pens without the group having to be repenned from such a feed supply area provided with a feeding device to some other feeding area. Instead, with the feeding trough apparatus according to the invention, it is possible to realise a concept for keeping livestock, in which, proceeding from a feed supply area provided with the feeding trough apparatus according to the invention, only enlargements in area are made in order to adjust the floor area of the pen to the size of the animals in the livestock group, but without necessitating complete repenning of the livestock animals or the replacement of the feeding devices.

According to a first preferred embodiment, the feeding trough has a longitudinally extended form and is shaped in such a way that the animals can preferably reach the trough interior only over a longitudinal side wall, in particular in that horizontal or vertical partition members are arranged in the region of the other side walls.

By providing the feeding trough in an elongated form extending in the horizontal direction, a plurality of animals can take up feed simultaneously and conveniently from the feeding trough. This can be done over two longitudinal side walls, but feeding is preferably done over one longitudinal side wall only of the feeding trough, for example by blocking the other longitudinal side wall with suitable blocking means such that the animals are prevented by the latter from reaching the trough interior, for example by a horizontally extending surface beside the trough interior in the region of said side wall edge, or such one-sided access can also be achieved, alternatively, by placing the feeding trough apparatus adjacent to a pen wall or by attaching the feeding trough by means of the trough frame to a side wall of the pen. A robust adjustment mechanism is made possible by providing access over two side wall edges, but in particular by providing access over a single side wall edge only, and when access is specifically designed to be over one side wall edge only, the height of the side wall edge can be adjusted by pivoting the feeding trough about an axis which is spaced apart from and parallel to the side wall edge or by means of a suitable movement of the feeding trough along a curved path.

According to another preferred embodiment of the invention, the feeding trough is pivotably mounted on the trough frame about a pivot axis which is spaced apart from the side wall edge on the access side, and in that the adjustment mechanism is adapted to pivot the feeding trough about the pivot axis from a first position into a second position. Adjusting the height of the side wall edge on the access side by pivoting the feeding trough allows a robust design that simultaneously avoids the risk of the livestock being injured by such movement, and by means of which other functions can be realised as a result of the pivoting movement. The pivot axis may be provided as a mechanical component in the form of an axle or shaft, about the central longitudinal axis of which the rotational movement occurs. The pivot axis may likewise be designed as an imaginary axis, in that a mounting is realised by means of one or more guide members forming such an imaginary pivot axis. According to the invention, the pivot axis may be fixed in relation to the trough frame and the feeding trough, or the pivot axis may be mobile in relation to the trough frame and/or the feeding trough and changes its orientation or position accordingly when adjusting the height of the side wall edge.

According to yet another embodiment of the invention, the trough frame has a floor mounting bracket comprising a floor contact area for installing or anchoring the feeding trough apparatus on a pen floor area and in that the adjustment mechanism is adapted to adjust the height of the side wall edge relative to the floor contact area of the floor mounting bracket. Such an embodiment of the trough frame allows the inventive feeding trough apparatus to be installed and anchored in a manner that can be applied in most pen designs, in that the feeding trough is installed and anchored on the pen floor by means of the trough frame. In this regard, the trough frame may be formed by a single frame member or by two or more such frame members, which are attached to the feeding trough spaced apart from each other. The floor contact area is formed by those points of contact where the trough frame rests on the pen floor. The pen floor is to be understood in this context as a suitable floor-supporting structure to which the trough frame can be suitably attached and which could also receive other floor covering elements, such as slatted tiles or the like, on which the livestock stand.

It is further preferred that the feeding trough can be moved from a first position, in which young animals, in particular piglets, can reach the trough interior, to a second position, in which parent animals, in particular sows, but not young animals, in particular piglets, can reach the trough interior. The entire livestock rearing period is covered by the embodiment in which two such defined positions can be set for the feeding trough. After a predetermined period following the birth of a young of a young animal, in which the young animals are fed mother's milk, the young animals are separated from the mother, and separate rearing of the young animals begins. From that time onwards, which may be a few weeks after birth, the young animals take their feed from a suitable feeding device such as the feeding trough according to the invention and continue to grow until they reach the end of their growth. The size and weight of the animals increase in the process. The feeding trough apparatus according to the invention allows the livestock animals to be fed from the feeding trough in a species-appropriate manner from a young age until they are adults and with a reduced risk of the feeding trough being contaminated, due to dirt entering from the outside or due to feed being lost by being carried out of the feeding trough. It should be understood in this regard that the feeding trough can be adjusted directly from the defined first position to the defined second position, but also that this adjustment may be over several defined intermediate stages, or infinitely variably, for example in that the feeding trough is vertically raised or lowered by means of an actuator that can be actuated in steps or continuously via the adjustment mechanism, or the feeding trough is suitable pivoted in such a way that the height of the side wall edge is changed in steps or continuously. In the first position, the height of the feeding trough is one that allows young animals such as piglets to take up feed from the trough interior. In the second position, in which the side wall edge is adjusted higher than in the first position, young animals such as piglets would no longer be able to take up feed from the feeding trough because they can no longer reach the trough interior due to the side wall edge being higher. The larger animals, on the other hand, and in particular the adult animals, can comfortably reach the trough interior in this second position and take up feed from it.

According to yet another preferred embodiment of the Invention, a further supply device for livestock is provided, which is in signal or mechanical communication with the adjustment mechanism to adjust the height of said supply device to the size of the animals, in particular a drinking trough comprising a liquid receiving area which is in signal or mechanical communication with the adjustment mechanism to adjust the height of said liquid receiving area to the size of the animals. In the case of such a drinking trough as well, it is advantageous for age-appropriate drinking access when the height of the liquid receiving area, for example the drinking bowl, the drinking nipple, a liquid discharge opening or the like, is adjusted to the size of the animal. In the case of a direct mechanical coupling, the liquid receiving area can be in mechanical communication with the adjustment mechanism for the feeding trough apparatus according to the invention and be adjusted in height by said adjustment mechanism. Alternatively, however, the coupling may also take the form of signal communication, for example in that a control signal is emitted by a control unit to drive the adjustment mechanism of the feeding trough apparatus according to the invention, or is likewise used to adjust the height of the additional supply device, or in that the height of the side wall edge of the feeding trough apparatus according to the invention is detected by a sensor unit, for example by scanning the adjustment mechanism, and the signal from said sensor being used to adjust the height of the additional supply device.

The further supply device may preferably be coupled to the adjustment mechanism in such a way that the adjustment path of the further supply device differs from the adjustment path of the side wall edge of the feeding trough by a factor that is smaller than one or by a factor that is greater than one. This embodiment provides step-up or step-down leverage either by control technology or mechanically, by means of which leverage the additional supply device can be adjusted with a smaller adjustment path or a larger adjustment path than the side wall edge of the feeding trough. This is advantageous for adjusting the height of a drinking device to the growth of the livestock animals, for example, as the outlet opening of the drinking trough must be adjustable in height, from a starting position, by a greater difference than the side wall edge of the feeding trough. If the livestock animal is to be permitted to use the drinking trough and the feeding trough in accordance with its size. The different adjustment paths may preferably be provided by a mechanical lever coupling with a transmission ratio for movement of the side wall edge of the feeding trough.

The feeding trough apparatus according to the invention may be further developed by a blocking mechanism which guards the trough interior to prevent young animals, in particular piglets, from getting into the trough interior, the blocking mechanism preferably comprising a plurality of blocking members, for example stay rods, which extend spaced apart from each other above the floor of the trough interior. It is a known problem in this regard that young animals like piglets try to climb into the feeding trough in the first days or weeks in which they feed themselves from troughs, due to their play instincts and their lack of familiarity with the new kind of feeding, and that in some cases they end up with their entire body in the trough interior. This is a problem for hygiene, on the one hand, because the young animals contaminate the feed in doing so, but it can also endanger the lives of the young animals, particularly when they are being fed with liquid feed, since they can drown in the feeding trough. As a precaution against this risk, the invention provides a blocking mechanism that prevent young animals from getting into the trough interior. Such prevention of access is to be understood in this regard as meaning that the young animals cannot succeed in reaching the trough interior completely with their entire bodies and end up standing on the floor of the feeding trough. The blocking mechanism may be formed, by a tile provided with holes, for example, or by a plurality of blocking members extending in a plane of an opening through which the livestock take the feed from the trough interior, or running underneath such an opening. The blocking mechanism may also perform such a function, basically, that although the young animals can get into the trough interior, they are kept by the blocking mechanism at a particular height inside the trough interior so that they get as far as the floor of the feeding trough and do not get exposed as a result to the risk of drowning in liquid feed.

In the two preferred embodiments described in the foregoing, with a blocking mechanism and with adjustment of the feeding trough from a first into a second position, it is particularly preferred that the blocking mechanism is coupled to the adjustment mechanism and in the first position blocks access to the trough interior by the young animals and in the second position does not. More particularly, the blocking mechanism is generally needed and preferred when the feeding trough according to the invention is in the first position, that is to say in the position with a lowered side wall edge for feeding young animals. When feeding adult animals, in contrast, which do not try to climb into the feeding trough, it is less desirable for blocking members to extend or be present above the floor of the feeding trough in the area where the animals take up their feed, since these blocking members pose a risk of injury to the head or mouth of the animals when taking up their feed and because they make it more difficult to clean the feeding trough, especially the floor area thereof. It is therefore preferred that the blocking mechanism be functionally arranged above the floor of the feeding trough in the first position but not in the second position, in order to reduce or prevent the risk of injury and/or the problem for cleaning. It should be understood in this regard that the blocking mechanism can be coupled to the adjustment mechanism in such a way, in particular, that the blocking mechanism is fixed inside the feeding trough interior and can be moved jointly with the feeding trough, due to the feeding trough being coupled to the adjustment mechanism, thus resulting in the blocking mechanism being moved out of the region above the floor where it poses a risk of injury to the adult animals. This can be achieved, for example, by pivoting the feeding trough out of the first and into the second position. According to the invention, however, there are also ways of coupling the blocking mechanism which are more complex in design, in which the blocking mechanism is coupled separately and directly to the adjustment mechanism so that it is moved out of the region above the floor by the adjustment mechanism when performing adjustment, and this can be done in such a way, in particular, that the blocking mechanism is removed from the region above the floor or is lowered to the level of the floor when adjusting the height of the side wall edge by a particular height relative to the lowest position, such that there are no longer any blocking members at the level where they pose a more relevant risk of injury to the adult animals. It should be understood as a basic principle in this regard that it is not necessary to remove the blocking members completely from the trough interior in order to achieve the advantage according to the invention. The risk of injury to the adult animals is already reduced, in contrast, when the blocking members are moved from a raised position relative to the feeding trough into a lowered position closer to the feeding trough, or when the blocking members are moved out of the floor region of the feeding trough, in which the livestock animals take up what is mainly the remainder of the feed. There need not necessarily be any relative movement between the side walls and the floor of the feeding trough, for the one part, and the blocking members, for the other part, but it is also possible instead that, due to movement of the feeding trough, a region of the side walls/floor may arrive at the lowest position that was not previously in the lowermost position and which is not guarded by respective blocking members lying above it.

It is further preferred, in particular when the side wall edge is vertically adjusted by pivoting the feeding trough about a pivot axis, that the blocking mechanism is fixedly connected to the feeding trough and that the blocking mechanism includes mechanical blocking members which run approximately horizontally in the first position and at an incline to the horizontal in the second position. In this embodiment, the floor of the feeding trough is formed in the first position by a first wall section and in the second position by a second wall section different from the first wall section, wherein only the first wall section is guarded by blocking members spaced apart therefrom against young animals falling through as far as these wall sections and drowning in the feeding trough. The second side wall section, which in the first position is typically a side wall, does not have any such blocking members, in contrast, and when it becomes the floor surface by pivoting the feeding trough, it allows adult animals to take up feed from the feeding trough without any risk of injury. In this embodiment, the blocking members are typically pivoted in the second position in such a way that they run in the region of a side wall that was previously the floor surface in the first position.

It is further preferred that the feeding trough has a first floor surface which is horizontally oriented in the first position and runs approximately parallel above the preferably one blocking mechanism for preventing young animals, in particular piglets, from getting into the trough interior, and has a second floor surface which is horizontally oriented in the second position and runs at an incline to the blocking mechanism. In this embodiment, the feeding trough has wall sections that are functionally separate, but which can be varied in their function by adjusting the side wall edge, to function as a floor surface in the one position, and to function as a side wall surface in another position. As described in the foregoing, the surfaces can be formed by planar wall sections or by wall sections that are dome-shaped, curved or have some other kind of irregular shape. This embodiment makes it possible to provide two functionally different floor surfaces which represent the respective floor surface in the different positions of the feeding trough and which each represent a respective side wall surface of the feeding trough in a different position, and which for their part may each have or may not have a respective blocking mechanism, in order to adapt the feeding trough to the needs of young animals and adult animals, respectively. It should be understood in this regard that, although the feeding trough may be provided with such different surfaces, the blocking mechanism function that is actually provided in a particular intermediate position may be only partially performed or may be cancelled by the infinitely variable adjustment of the feeding trough.

It is still further preferred that the feeding trough is pivotably mounted about a pivot mounting having a hollow axle and is further characterised by a feed supply line which is connected to the hollow axle to supply feed through the hollow axle into the trough interior. By supplying the feed in such a manner through the hollow axle, which simultaneously defines the pivot axis of the feeding trough, the feeding trough can advantageously be filled with feed whatever the position of the side wall edge. This design also allows a construction that is robust on the whole and easy to clean, since it dispenses with a separate mounting and a separate feed supply line by providing these as integral components. Feed can be supplied on one side only by a single hollow axle, or alternatively can also be supplied, particularly in the case of larger feeding troughs, through two hollow axles which open into the trough interior at two spaced-apart points.

According to another preferred embodiment of the invention, the feeding trough is mounted pivotably about a pivot axis and can be pivoted by means of an adjustment mechanism comprising a drive shaft which is arranged opposite the access side wall edge on the access side and which is coupled to the feeding trough in order to transfer a torque, in particular by means of a gear wheel which is attached to said drive shaft and which engages with a gear wheel segment connected to the feeding trough. In this embodiment, the adjustment mechanism is located robustly, and safely for the animals, in a region that cannot be reached by the animals and which can preferably be used constructionally for a robust adjustment mechanism. Due to interaction between a gear wheel and a gear wheel segment, it is possible to provide a step-down transmission ratio that is advantageous for actuation, as a result of which even large feeding troughs filled with animal feed can be efficaciously adjusted. More particularly, it is possible with this adjustment mechanism to pivot the feeding trough about the pivot axis with a high torque. The adjustment can basically be performed by disposing a gear wheel segment on one side, immediately adjacent to the trough frame, in particular. Alternatively, however, there are also other embodiments or other design variants that are included in the invention, for example an arrangement of the gear wheel segment in the middle between two lateral trough frames, or two gear wheel segments arranged on either side.

Adjustment of the height of the side wall edge using the adjustment mechanism may basically be performed by the livestock owner by hand, that is to say by manually operating the adjustment mechanism, for example by operating a lever or turning a crank, with a respectively embodied adjustment mechanism converting this movement into vertical adjustment of the side wall or the side wall edge. More particularly, however, it is preferred that the feeding trough apparatus according to the invention has an electrical, pneumatic or hydraulic drive unit for driving the adjustment mechanism. This way of driving the adjustment mechanism allows it to be operated comfortably and automatically, if necessary, and preferably can be realised by an electric motor whose rotational movement is converted by the adjustment mechanism into vertical adjustment of the side wall edge.

The feeding trough apparatus according to the invention may be further developed in this regard by providing a control unit which actuates the drive unit for driving the adjustment mechanism, depending on a timing sequence, a weight measurement or a measurement of animal size, in order to adjust the side wall edge by an at least single-step, preferably multi-step or infinitely variable adjusting movement from a first position for young animals to a second position for adult animals. This functionally programmed control unit allows a livestock owner to activate the control unit in such a way, when placing the animals into the pen in which the feeding trough apparatus according to the invention is located, that it makes a once-only adjustment of the side wall edge to a greater height once a predefined period has elapsed or when a predefined individual weight or average weight of the livestock animals is exceeded, or alternatively to define several discrete time intervals or weights, according to which a respective stepped adjustment is made by the drive unit until a final position of the side wall edge for fully-grown animals is reached, in order to adjust the height of the side wall edge continuously to the growth of the livestock animals.

It is still further preferred that the feeding trough can be pivoted, in particular by means of the adjustment mechanism, into a cleaning position in which the trough opening faces downwards. In this cleaning position, which differs from the first and second positions, it is possible for the trough interior and the trough walls to be cleaned effectively and for the water used for cleaning to run off well. The feeding trough can be decoupled for cleaning purposes from the adjustment mechanism by means of suitably detachable coupling members. Alternatively, the adjustment mechanism may also be designed to move the feeding trough out of the first or second position or an intermediate position into the cleaning position.

The feeding trough according to the invention may be developed, finally, by providing a filling level measuring device for detecting a filling level in the trough interior, said filling level measuring device preferably being in signal communication with a feed control unit for filling the trough interior with feed, and said feed control unit being adapted to start, stop and/or reduce the supply of feed into the trough interior according to the signal from the filling level measuring device. Such a filling level measuring device may be provided in the form of an electrode unit placed at a particular height above the floor of the feeding trough in order to detect a single specific filling level, for example, or in the form of a measuring device for detecting a plurality of defined filling levels. In particular, the filling level measuring device may be coupled to a feed control unit which controls how the feeding trough is filled with feed, in order to thus control any replenishment of feed when the filling level drops below a particular level, or to prevent any further filling when a particular filling level is exceeded.

Another aspect of the invention is a livestock pen comprising a feeding trough apparatus of the kind described above, the animal rearing pen being characterised in that the feeding trough apparatus is arranged in a pen area which is demarcated by barrier walls, the floor area of which can be enlarged or reduced by repositioning partition walls or by removing or adding partition walls. Such a livestock pen advantageously implements the functions that are provided by the feeding trough apparatus according to the invention, in that a floor area of a pen, containing a group of livestock animals that can take up feed from the feeding trough apparatus, can be enlarged according to the increasing space requirements of these growing animals, without having to repen the livestock or provide a different feeding trough apparatus.

BRIEF DESCRIPTION OF THE DRAWINGS

A preferred embodiment of the invention shall now be described with reference to the attached Figures, in which:

FIG. 11 is a partial longitudinal cross-sectional view at an angle from below of the feeding trough apparatus according to the invention, in the first position as shown in FIG. 1;

FIG. 12 is a plan view of a second embodiment of the feeding trough apparatus according to the invention;

FIG. 13 is a perspective view, seen at an angle from the front, of the second embodiment shown in FIG. 12, in the position for young animals;

FIG. 14 is a view as in FIG. 13, in the position for adult animals;

FIG. 15 is a cutaway perspective view along line A-A in FIG. 12 of the apparatus shown in FIG. 12, in the position for young animals; and FIG. 16 is a view as in FIG. 15, in the position for adult animals.

DETAILED DESCRIPTION OF THE PREFERRED EMBODIMENTS

Figure 1:
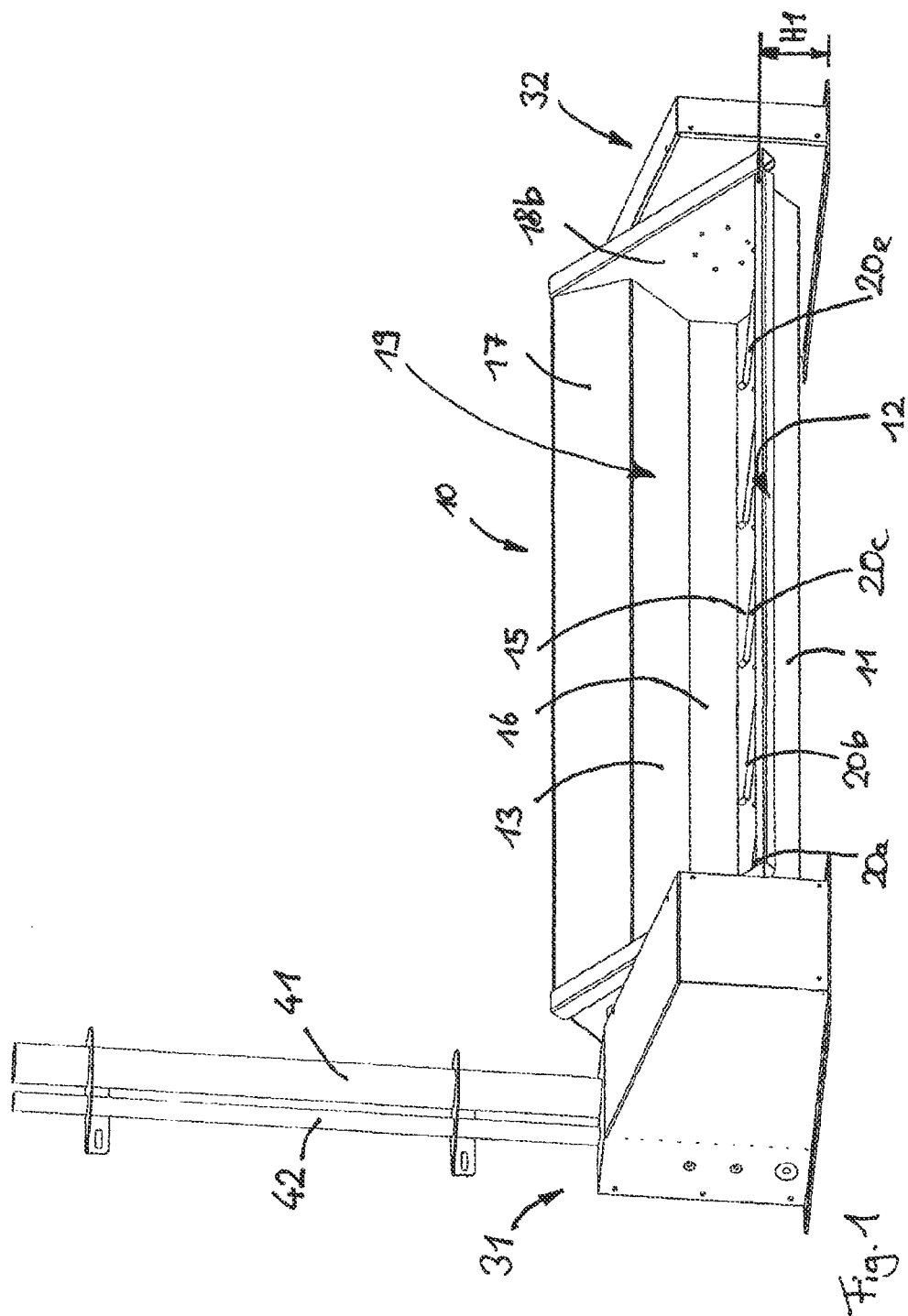
FIG. 1 is a front side perspective view of a preferred embodiment of the feeding trough apparatus according to the invention, in a first position for young animals.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring first to FIG. 1, the feeding trough apparatus according to the invention comprises a feeding trough 10 extending longitudinally between two trough frame members 31, 32 that form a trough frame, and to which the feeding trough is attached. The left trough frame 31 is connected to a feed supply line 41 and to a channel 42 for supplying electrical energy and control signals, said feed supply line and channel extending vertically and parallel to each other.

The feeding trough has a side wall 11 on the access side, with an upper side wall edge 12, and a side wall 13 opposite said side wall. Side walls 11, 13 and side wall edge 12 on the access side extend in the longitudinal direction of the feeding trough. As can be seen better from FIG. 7, three wall surfaces likewise extending in the longitudinal direction of the feeding trough are disposed at the lower end of side walls 11, 13 and connect side walls 11, 13 to each other and perform the function of bottom walls or side walls, depending on the position of the feeding trough.

At the top end of side wall edge 13, a horizontal wall member 17 is arranged which has such a width transverse to the longitudinal extension of the feeding trough that livestock cannot comfortably reach the trough interior 19 over the side opposite the access side.

Side wall surfaces 11, 13 and wall surfaces 14, 15 and 16 and horizontal wall section 17 are integrally produced from a single sheet of metal by folding. The shaped body formed in this manner, with a hollow space defined by side walls 11, 13 and wall surfaces 14-16, is bounded on either side, in cross-section, by side wall members 18a, b. A trough interior 19, in which feed for livestock animals is disposed and from which said feed can be taken by the livestock animals, is defined by side wall surfaces 11, 13, wall surfaces 14-16 and side wall members 18a, b.

In FIG. 1, the feeding trough is shown in a first position in which side wall edge 12 has been lowered so far, by pivoting the feeding trough about a pivot axis relative to trough frame members 31, 32 that it has a height H1 relative to floor contact areas 31a, 32a of trough frame members 31, 32. In this first position, which is a piglet position, trough interior 19 is reachable for young animals or piglets, and young animals are able to take up feed from trough interior 19.

As can be seen from FIG. 1, there is also a blocking mechanism formed by a total of five barrier rods 20a-e extending above wall surface 13 transversely to the longitudinal direction of extension in trough interior 19. Barrier rods 20a-e run parallel to wall surface 14, which in the first position forms the bottom surface of the feeding trough, and are arranged approximately at the height of side wall edge 12. Barrier rods 20a-e are arranged at such a distance from each other that a young animal cannot fall through the barrier rods into the trough interior and lie in such a way on wall surface 14 that it can drown in the feed in trough interior 19.

Figure 2:
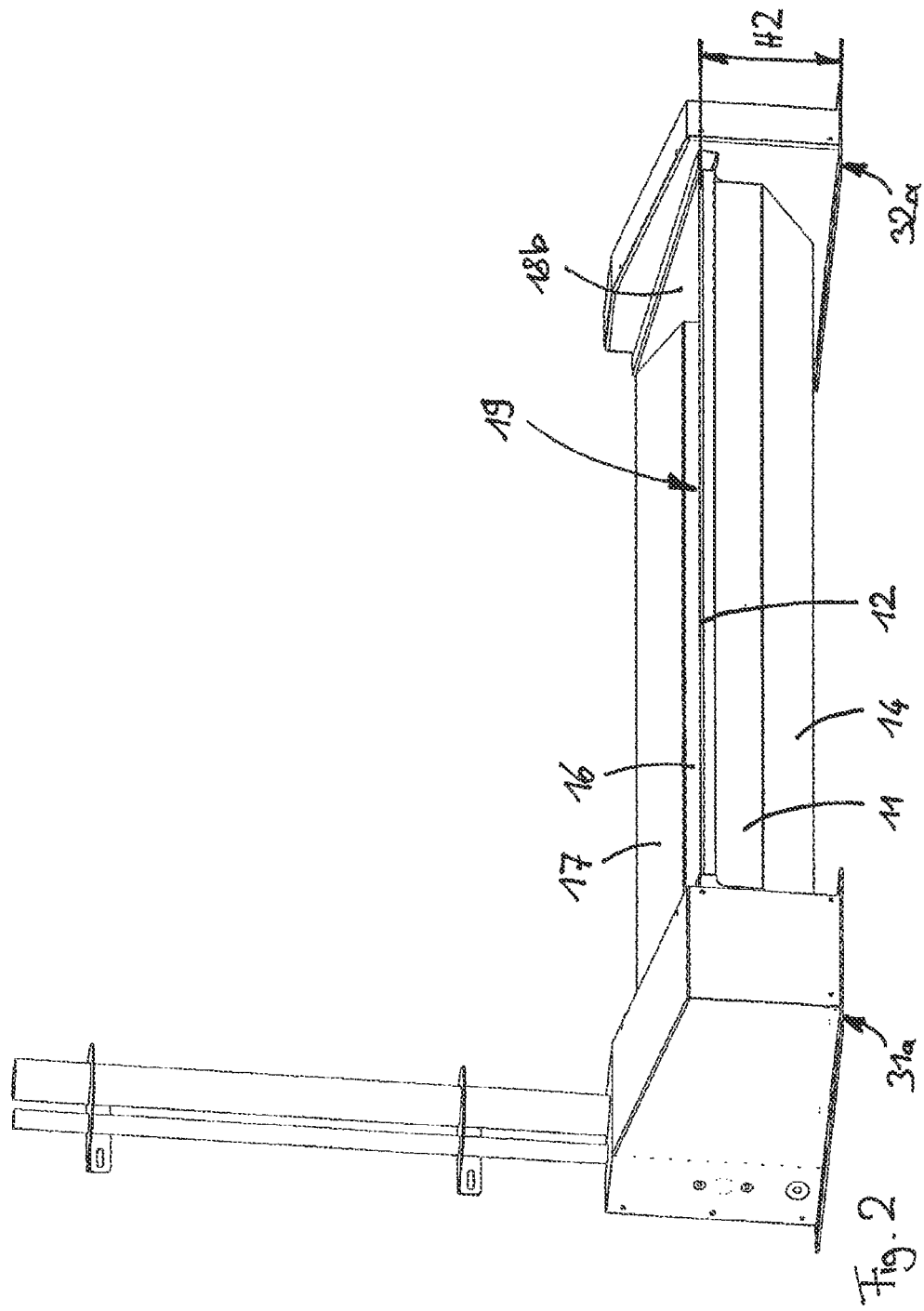
FIG. 2 is the perspective view as in FIG. 1, in a second position for adult animals.

FIG. 2 shows the feeding trough apparatus according to the invention in a second position for adult animals. In this second position, which is a fattening pig position, feeding trough 10 has been pivoted about a pivot axis such that side wall edge 12 on the access side is raised relative to the first position shown in FIG. 1. In this second position, side wall edge 12 on the access side is at a height H2 that no longer allows young animals such as piglets to reach the trough interior, whereas adult animals such as feeding pigs can comfortably take up feed from the trough interior. Due to this pivoting of the feeding trough, wall surface 14 has been pivoted out of its horizontal position and in functional terms partly forms a side wall now. As can be seen better from FIG. 8, the bottom surface in this second position is provided by wall surface 15, whereas wall surfaces 14 and 16 are slanting wall surfaces that partly perform a side wall function and partly a bottom wall function.

Figure 3:
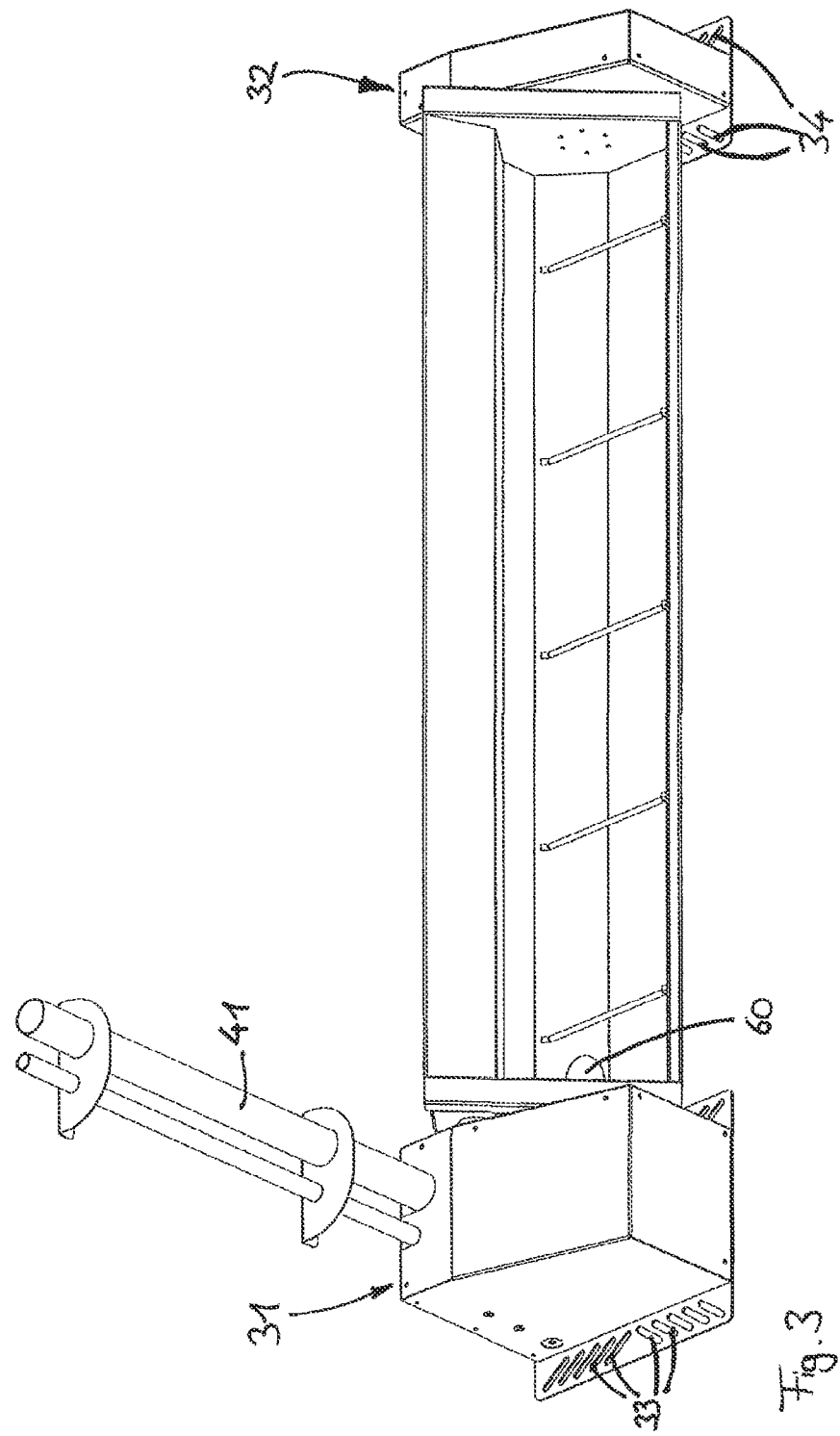
FIG. 3 is another front side perspective view of the feeding trough apparatus in the position shown in FIG. 1.
Figure 4:
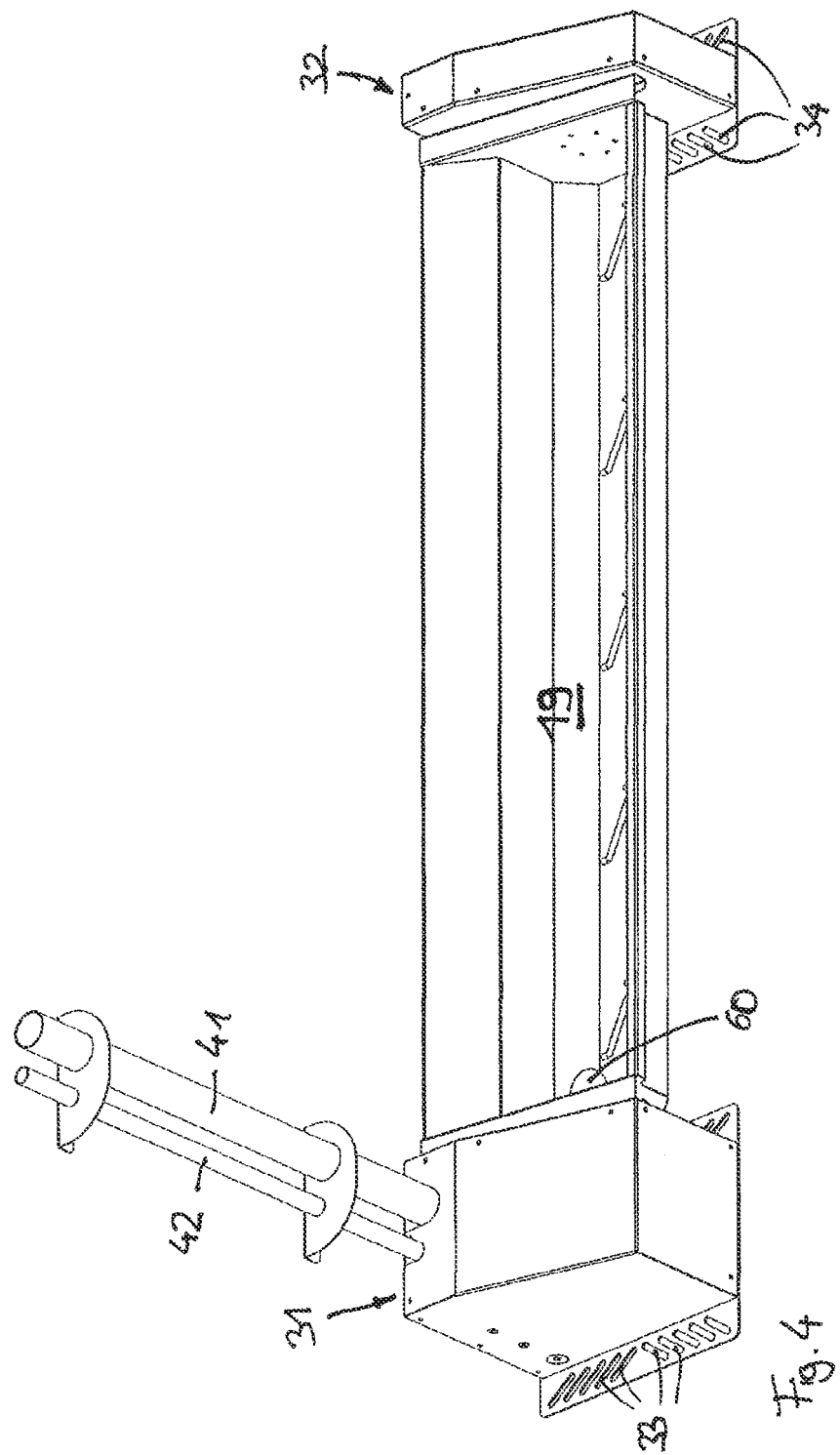
FIG. 4 is another front side perspective view of the feeding trough apparatus in the position shown in FIG. 2.

It can be seen from FIGS. 3 and 4 that both the left trough frame member 31 and also the right trough frame member 32 can be bolted to a pen floor using a plurality of elongate holes 33, 34, so that the feeding trough apparatus according to the invention stands securely. Elongate holes 33, 34 are arranged in horizontally oriented base plate sections which define floor contact areas 31a, 2a of the feeding trough apparatus.

It can also be seen that there is a hollow axle 50 which opens into trough interior 19 and through which the animal feed flowing through feed supply line 41 can be filled into the trough interior.

Figure 5:
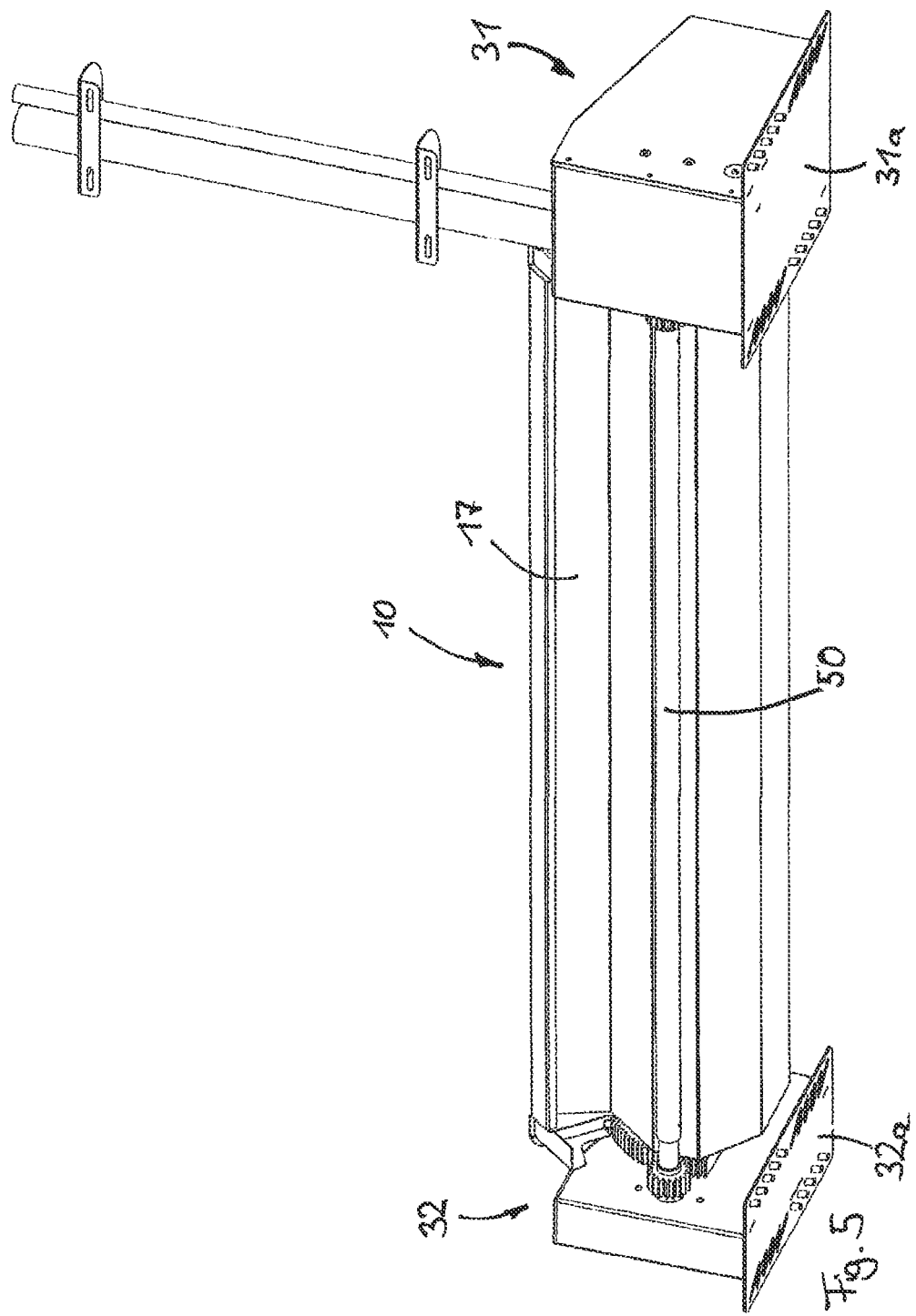
FIG. 5 is a perspective view, from below and behind, in the position shown in FIG. 1.
Figure 6:
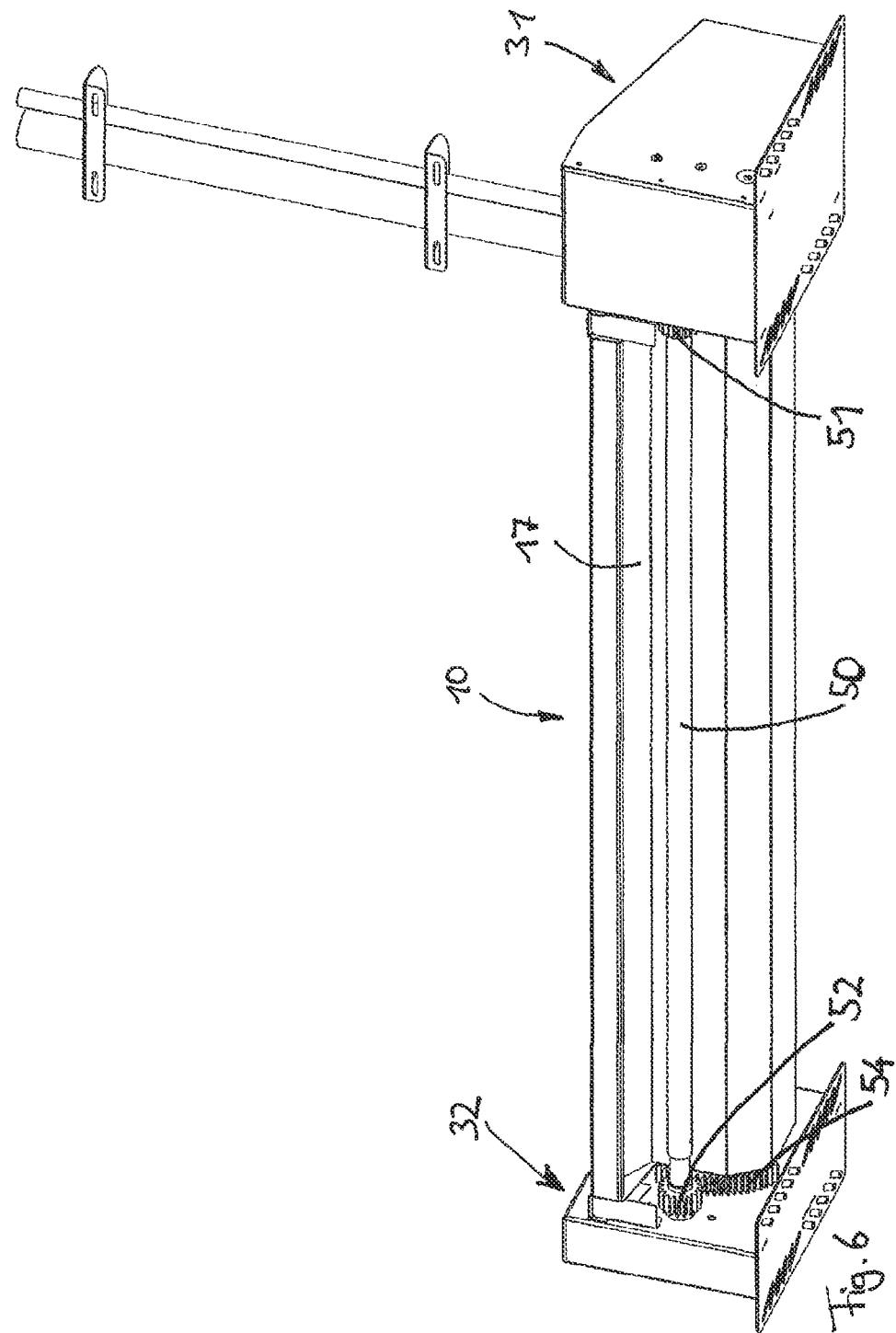
FIG. 6 is a perspective view, from below and behind, in the position shown in FIG. 2.

In the rear view shown in FIGS. 5 and 6, the adjustment mechanism of the feeding trough apparatus according to the invention can be seen in greater detail. In the rear area of trough frame members 31, 32, adjacent to the feeding trough and below the horizontal wall surfaces 17, a drive shaft 50 extends from trough frame member 31 to trough frame member 32 and is rotatably mounted on either side inside said trough frame members. Immediately adjacent to the two trough frame members 31, 32, two gear wheels 51, 52 are fixed torque-resistantly to said shaft. Gear wheels 51, 52 engage with gear wheel segments 53, 54, which for their part are fixed torque-resistantly to feeding trough 10. Gear wheel segments 53, 54 are embodied as an outer ring and form a circular gear segment of approximately 45°, as can be seen in greater detail in FIG. 9.

By rotating shaft 50, the feeding trough can be pivoted infinitely variably from the first position shown in FIG. 1 to the second position shown in FIG. 2 and, if necessary, even further to a position in which the side wall edge on the access side is even higher than shown in FIG. 2.

Figure 7:
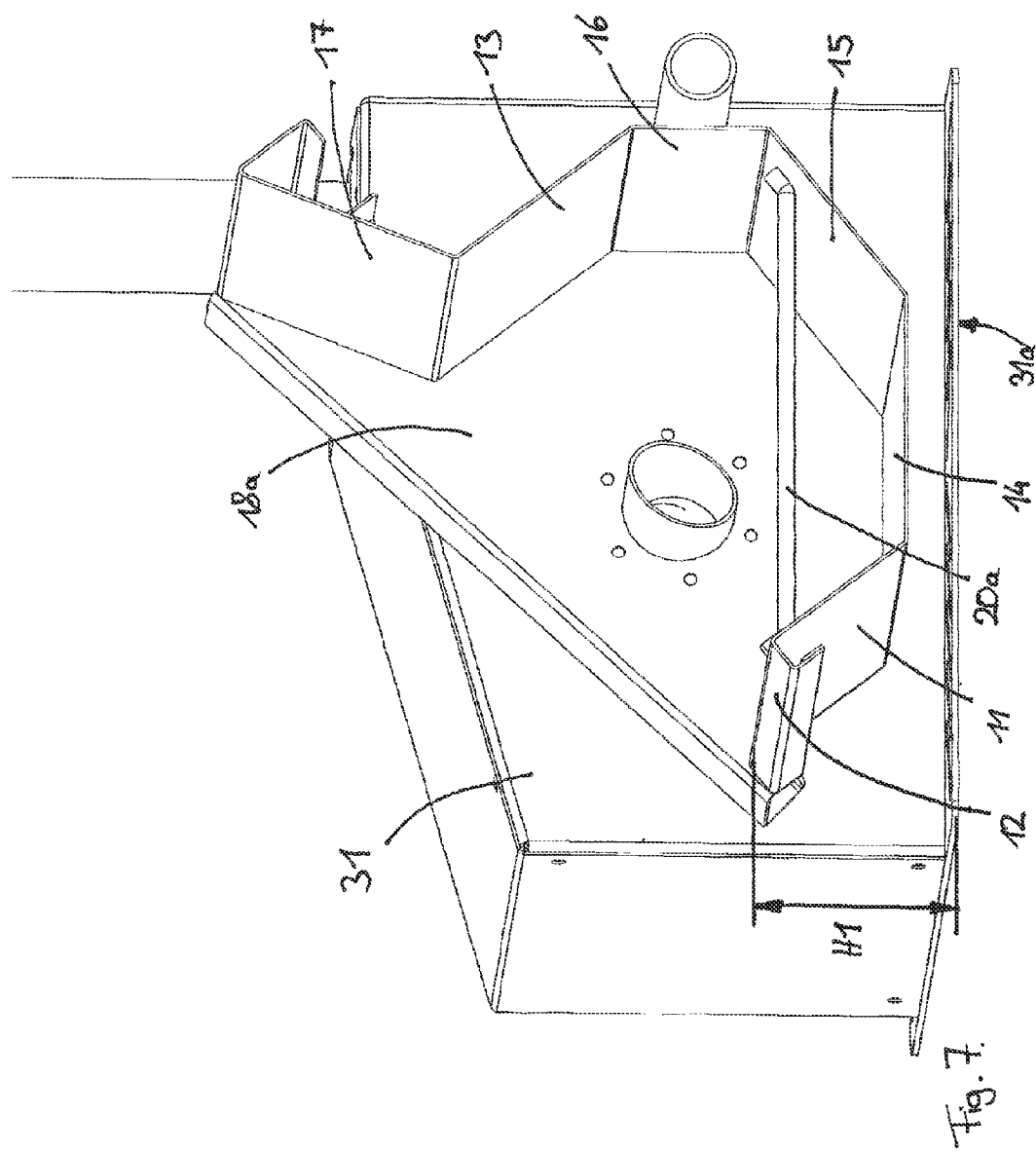
FIG. 7 is a perspective, cross-sectional cutaway view, at an angle from the side and from above, of the lateral trough frame and the cutaway part of the feeding trough in the first position as shown in FIG. 1.
Figure 8:
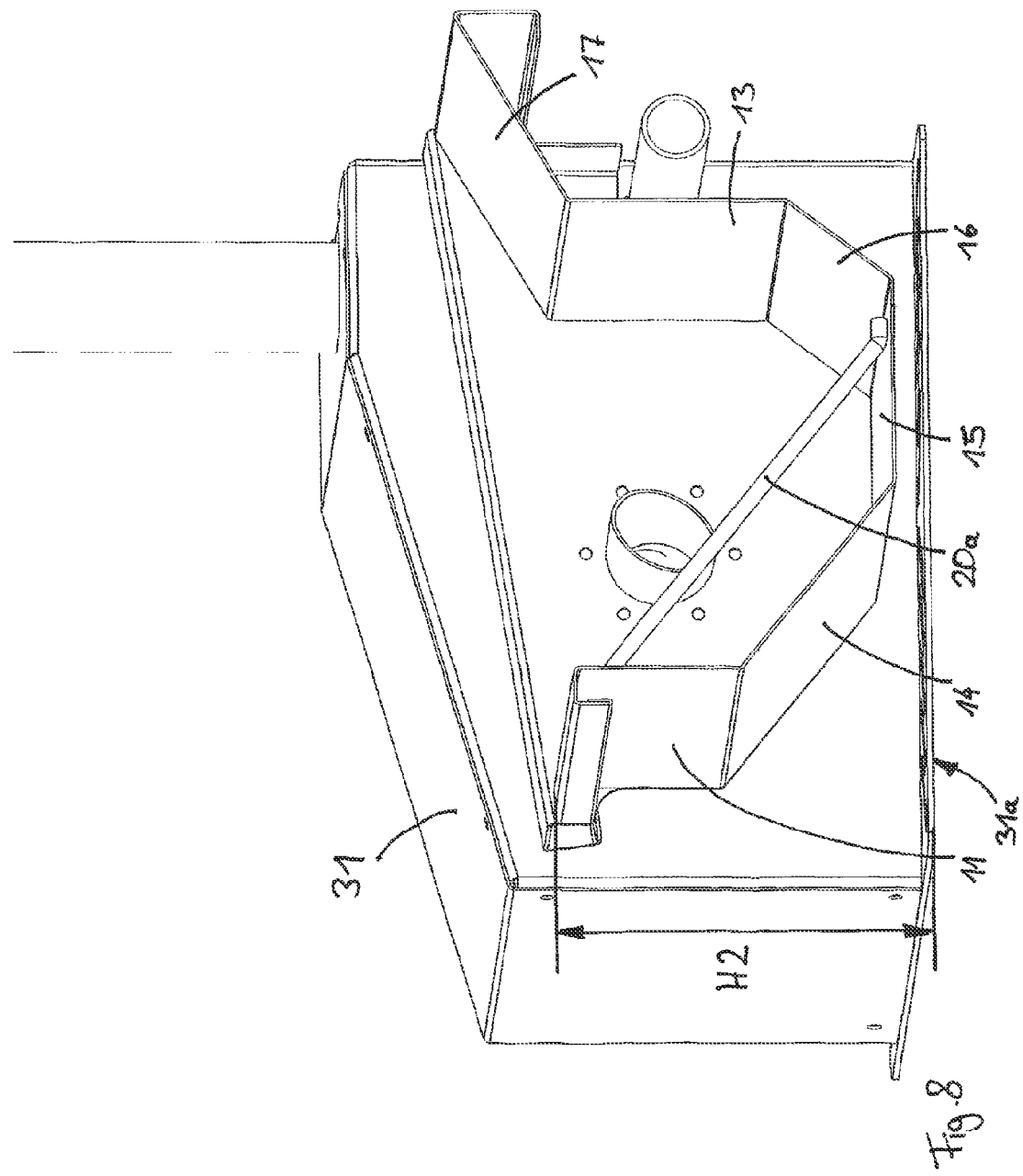
FIG. 8 is a view as in FIG. 7, in the second position as shown in FIG. 2.

FIG. 7 shows a partial transverse cutaway view, in which the feeding trough is in the first position for young animals. As can be seen, barrier rods 20a-e extend approximately horizontally in this first position and they run parallel to wall surface 14 which in this position forms the bottom surface of the feeding trough. The side wall edge 12 on the access side in is at a lower height H1 above the floor contact area 31a, thus allowing young animals to take up feed from the trough interior 19. In this first position, the trough interior allows itself to be filled to a low filling height above bottom surface 14, but that is sufficient, given the length of the feeding trough, for young animals to take up their feed. FIG. 8 shows a view as in FIG. 7, but with the feeding trough in the second position. In this second position, the bottom surface is formed by wall surface 15, and side wall edge 12 on the access side has been raised relative to the first position shown in FIG. 5 and has a greater height H2 relative to floor contact area 31a. In this second position, the feeding trough can be filled with more feed in total than in the first position, as the distance between side wall edge 12 and the bottom surface, formed here by wall surface 15, is greater than the distance of side wall edge 12 from the bottom surface in the first position, which is formed there by wall surface 14.

As can also be seen in the Figures, barrier rods 20a are arranged slantingly relative to the horizontal in the second position and no longer block the trough interior with a horizontal arrangement in the upper region of the trough. When the feed is filled to a substantial height inside the trough interior, barrier rods 20a-e no longer disturb the animals when eating and their slanting orientation reduces the risk of injury for the animals even when they are eating the remainder of feed that is close to the floor of the trough.

Figure 9:
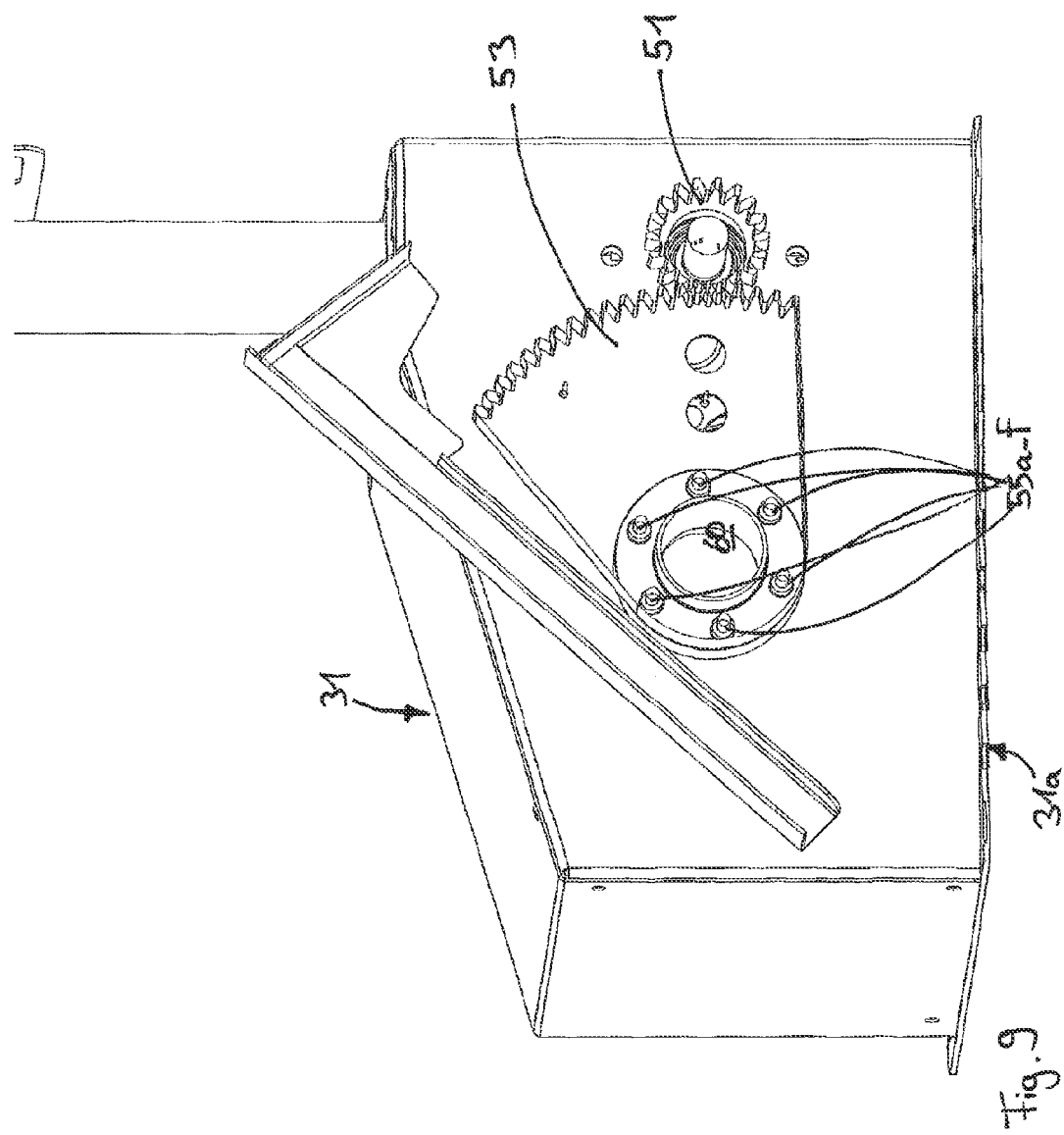
FIG. 9 is another cutaway view, as in FIG. 7, with different sectional planes.

FIG. 9 shows gear wheel segment 53, which is fixed by a total of six screws 55a-f arranged at a radius around the inner space of hollow axle 60. The central longitudinal axis of hollow axle 60 forms the pivot axis of the feeding trough.

Figure 10:
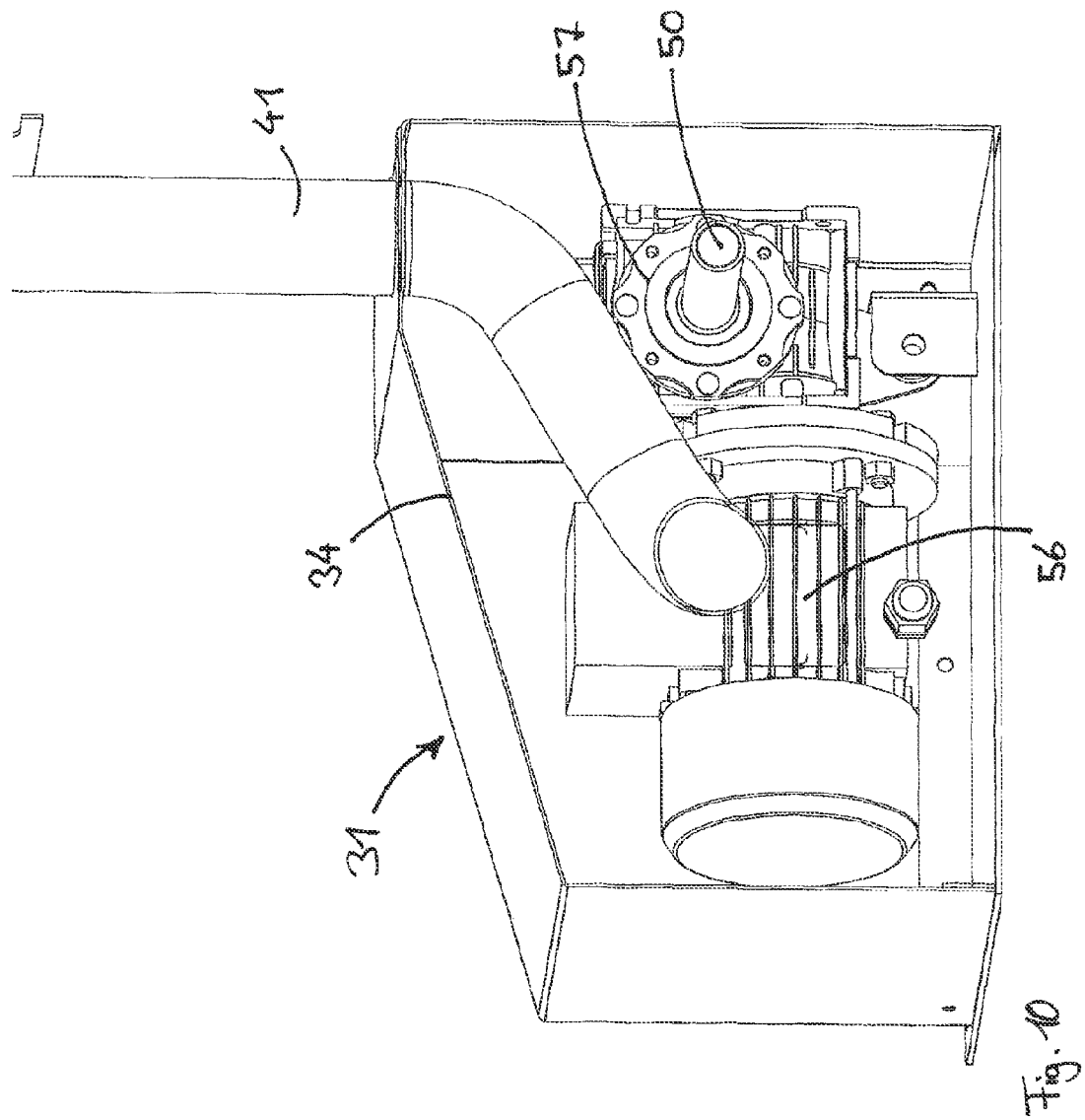
FIG. 10 is a perspective view of a cutaway trough frame as shown in the views shown in FIGS. 7 to 9.

The constructional design of the left trough frame member 31 can be seen from FIGS. 10 and 11. As can be seen from the latter, the feed line 41 is bent twice in the region below where it enters into a trough frame member housing 34 and runs horizontally after the second bend. The horizontal section 60 of the feed line forms the hollow axle on which the feeding trough is pivotably mounted on the left-hand side by means of a bearing ring 61.

Also disposed inside trough frame housing 34 is an electrical drive motor 56, which drives the pivot shaft 50 by means of a mitre gear 57. Pivot shaft 50 is rotatably mounted in trough frame member 31 by means of a bearing unit 58 and extends out of trough frame member 31 and across in a longitudinal direction as far as the second trough frame member 32. In the preferred embodiment shown here, animal feed is fed to the trough interior on one side via trough frame member 31 and feed line 41, 60 running therein. On this feed supply side, the feeding trough is pivotably mounted in a corresponding manner on the feed line embodied as hollow axle 60. On the opposite side, only a bearing for drive shaft 50 and a mounting for the feeding trough about a pivot axis are disposed in trough frame member 32.

The feeding trough apparatus according to the invention is operated in such a way that, when the young animals are placed in their pen, the feeding trough is pivoted into the position shown in FIGS. 1, 3, 5, 7, 9 and 11, and the young animals are then fed by supplying animal feed one or more times into the trough interior. After five weeks, a control unit (not shown) activates drive motor 55 for the first time to rotate pivot shaft 50 and as a result to adjust the feeding trough by a specific angle such that the side wall edge 12 on the access side is raised a little. This prevents the young animals, which have grown in the meantime, from climbing into the trough interior and also adjusts the amount of feed to be received in the trough interior as well as the access height to the amount that the young animals have grown by in the meantime. As growth continues, drive motor 55 is actuated by the control unit at two-day intervals to pivot the feeding trough in a plurality of steps such that the side wall edge on the access side is raised further, until the second position for adult animals has been reached with several adjustments over a period of four weeks. The feeding trough remains in the latter position until the animals are taken out of the pen and new young animals are placed in the pen. The feeding trough is then pivoted in the opposite direction back to the first position in a single adjustment by the control unit and can then be decoupled from engagement with the gear wheels and gear wheel segments by drive shaft 50 being driven further. After decoupling, the feeding trough can be pivoted manually by about another 150 degrees and locked in that position, so that wall surfaces 14, 15 are pivoted to the top and the opening of the feeding trough faces downwards. In this position, the feeding trough can be conveniently cleaned by means of a pressure cleaner. After cleaning, the feeding trough is pivoted back into position, and the coupling is restored by means of the gear wheels and the gear wheel segments. The feeding trough is now in the piglet position and ready for a new rearing cycle.

In the course of these adjustments, the pen area in which the feeding trough apparatus is located is typically enlarged in two or if necessary more operations in order to meet the greater space requirements of the growing animals. For this purpose, pen areas previously put to other uses are made available to the animals by removing partition walls. No feeding devices are present or required in these other pen areas, as the animals are fed throughout their rearing from the feeding trough apparatus according to the invention.

Referring now to FIGS. 12-14 as well, a second embodiment of a feeding trough apparatus according to the invention comprises at least two feeding troughs 110, 210, which are basically identical in construction to the feeding trough 10 described in the foregoing. Feeding troughs 110, 210 are arranged parallel to each other in such a way that the respective side wall edges 112, 212 on the access side face outwards, and that the longitudinal side walls of the feeding trough opposite the access sides face towards each other.

Feeding troughs 110, 210 are supplied via feed lines 141, 241, which run on one side of the feeding troughs in basically the same manner as the feed line 41 described above.

Feeding troughs 110, 210 are separated from each other by two vertical wall members 310, 320 extending parallel to the side wall edges 112, 212 on the access side. At each end, transverse walls 330, 340 are attached to said partition walls 310, 320 by means of L-shaped profiles.

Outwardly facing drinking devices 311a, b, 321a, b are arranged at these transverse walls 330, 340. Each drinking device comprises a vertically extending water supply pipe 312a, b, 322a, b and a slantingly angled dispensing pipe 313a, b, 323a, b disposed at the bottom end of said water supply pipe. A different form of dispensing may also be provided, for example a drinking bowl or the like.

Above the dispensing pipe, the water supply pipes are mounted by means of a vertical movable holding device 314, 324 such that they can be vertically adjusted over an adjustment path s. The height of the opening of the dispensing pipe can be adjusted in relation to the floor contact area of the feeding trough apparatus. As can be seen in greater detail from FIGS. 15 and 16, holding device 314, 324 is coupled mechanically to feeding trough 110 by means of a lifting device 350, 360. For that purpose, a lever 351 which projects through a slot in partition wall 310 into the space between between partition walls 310, 320 is fixed to the substantially horizontal wall surface 117 of feeding trough 110. As a result of the pivoting movement of feeding trough 110, lever 351 moves vertically upwards and downwards, as can be seen from FIGS. 13 and 14. In the position for young animals, as shown in FIG. 13, lever 351 is in its upper position, whereas when the feeding trough is in the position for adult animals, as shown in FIG. 14, lever 351 is in its lower position.

The movement performed by the end of lever 351 that points inwards into the space between partition walls 310, 320 is transmitted by means of a horizontal axle 352, on which vertically extending levers 353, 363 are mounted, to two articulated levers 354, 364 via said articulated levers 354, 364 by means of a movable mounting point. Articulated levers 354, 364 extend parallel to partition walls 310, 320 in the direction of transverse walls 330, 340 and are pivotably mounted on partition wall 310 by means of respective mounting points 355, 365. At their outer end, pivoting levers 354, 364 are hingedly coupled by means of another connecting lever 356, 366 to the respective holding device 314, 324. The pivot axis of mounting points 355, 365 is arranged closer to the vertically moving lever 351 than to holding device 314, 324, thus resulting in step-up leverage by pivoting levers 354, 364.

As can be seen from FIGS. 13, 15, in comparison with FIGS. 14, 16, when the feeding trough is pivoted out of the position for young animals, as shown in FIGS. 13 and 15, in which the side wall edge 112, 212 on the access side and dispensing pipes 313a, b 323a, b are in a lowered position, into the position for adult animals, as shown in FIGS. 14 and 16, this leverage results in the side wall edge 112, 212 of the feeding trough being raised synchronously with the raising of dispensing pipes 313a, b323a, b. Dispensing pipes 312a, b, 323a,b are raised by a distance s, which is about six times as much as the height differential H of the side wall edge.

It is to be understood that variations and modifications can be made on the aforementioned structure and method without departing from the concepts of the present invention, and further it is to be understood that such concepts are intended to be covered by the following claims unless these claims by their language expressly state otherwise.

The invention claimed is:

1. A feeding trough apparatus for livestock animals, comprising:
 a feeding trough having a trough interior which is accessible to the livestock animals through a trough opening, the trough interior defined at the bottom and laterally by a bottom wall and side walls, respectively, wherein one of the side walls demarcates the trough interior for an access side from which the animals take up feed from the trough interior, the side wall on the access side having an upper side wall edge over which an animal's head must reach at least partly so that the animal can take up feed from the trough interior;
 a trough frame to which the feeding trough is fixed; and
 an adjustment mechanism adapted for adjusting the height of the side wall edge on the access side relative to the trough frame,
 wherein the feeding trough is pivotably mounted on the trough frame about a pivot axis which is spaced apart from the side wall edge on the access side and wherein the adjustment mechanism is adapted to pivot the feeding trough about the pivot axis from a first position into a second position.

2. The feeding trough apparatus according to claim 1, wherein the feeding trough has a longitudinally extended form and is shaped in such a way that the animals can reach the trough interior only over a longitudinal side wall, and wherein horizontal or vertical partition members comprise the other side walls.

3. The feeding trough apparatus according to claim 1, wherein the trough frame has a floor mounting bracket comprising a floor contact area for installing the feeding trough apparatus on a pen floor area and wherein the adjustment mechanism is adapted to adjust the height of the side wall edge relative to the floor contact area of the floor mounting bracket.

4. The feeding trough apparatus according to claim 1, wherein the feeding trough can be moved from a first position, in which young animals can reach the trough interior, to a second position, in which adult animals can reach the trough interior.

5. The feeding trough apparatus according to claim 1, comprising a supply device for livestock, the supply device being in signal or mechanical communication with the adjustment mechanism to adjust the height of the supply device to the size of the animal.

6. The feeding trough apparatus according to claim 5, wherein the supply device is a drinking trough comprising a liquid receiving area in signal or mechanical communication with the adjustment mechanism to adjust the height of the liquid receiving area to the size of the animal.

7. The feeding trough apparatus according to claim 5, wherein the supply device is coupled to the adjustment mechanism such that the adjustment path of the supply device differs from the adjustment path of the side wall edge of the feeding trough by a factor that is smaller than one or by a factor that is greater than one.

8. The feeding trough apparatus according to claim 1, further comprising a blocking mechanism that guards the trough interior to prevent young animals from getting into the trough interior, the blocking mechanism comprising a plurality of blocking members which extend spaced apart from each other above the floor of the trough interior.

9. The feeding trough apparatus of claim 8, wherein the blocking mechanism comprises a stay rod.

10. The feeding trough apparatus according to claim 8, wherein the feeding trough is adapted to pivot about a pivot axis from a first position into a second position and wherein the blocking mechanism is coupled to the adjustment mechanism such that in the first position the blocking mechanism blocks access to the trough interior for young animals, and in the second position the blocking mechanism does not block access to the trough interior for young animals.

11. The feeding trough apparatus according to claim 8, wherein the feeding trough is adapted to pivot about a pivot axis from a first position into a second position and wherein the blocking mechanism is fixedly connected to the feeding trough and the blocking mechanism includes mechanical blocking members which run approximately horizontally in the first position and at an incline to the horizontal in the second position.

12. The feeding trough apparatus according to claim 1, wherein the feeding trough has a first floor surface that is horizontally oriented in a first position and runs approximately parallel above a blocking mechanism for preventing young animals from getting into the trough interior; and
 a second floor surface which is horizontally oriented in a second position and runs at an incline to the blocking mechanism.

13. The feeding trough apparatus according to claim 1, wherein the feeding trough is pivotably mounted about a pivot mounting having a hollow axle, the feeding trough apparatus further comprising a feed supply line which is connected to the hollow axle to supply feed through the hollow axle into the trough interior.

14. The feeding trough apparatus according to claim 1, wherein the feeding trough is mounted pivotably about a pivot axis and can be pivoted by an adjustment mechanism comprising a drive shaft arranged opposite the access side wall edge on the access side and which is coupled to the feeding trough in order to transfer a torque to pivot the feeding trough.

15. The feeding trough apparatus of claim 14, wherein the adjustment mechanism includes a gear wheel that is attached to the drive shaft and that engages with a gear wheel segment connected to the feeding trough.

16. The feeding trough apparatus according to claim 1, further comprising a drive unit for driving the adjustment mechanism, the drive unit selected from the group consisting of an electrical, pneumatic, or hydraulic drive units.

17. The feeding trough apparatus according to claim 16, further comprising a control unit which actuates the drive unit for driving the adjustment mechanism depending on a timing sequence to adjust the side wall edge.

18. The feeding trough apparatus according to claim 17, further comprising a control unit which actuates the drive unit for driving the adjustment mechanism, wherein the adjustment is at least a single-step.

19. The feeding trough apparatus according to claim 17, further comprising a control unit which actuates the drive unit for driving the adjustment mechanism, wherein the adjustment is a multi-step.

20. The feeding trough apparatus according to claim 1, further comprising a control unit which actuates the drive unit for driving the adjustment mechanism, wherein the adjustment is infinitely variable.

21. The feeding trough apparatus according to claim 1, wherein the feeding trough can be pivoted by the adjustment mechanism into a cleaning position in which the trough opening faces downwards.

22. The feeding trough apparatus according to claim 1, further comprising a filling level measuring device for detecting a filling level in the trough interior, the filling level measuring device being in signal communication with a feed control unit for filling the trough interior with feed, and the feed control unit being adapted to start, stop and/or reduce the supply of feed into the trough interior according to the signal from the filling level measuring device.

23. A livestock pen; comprising a feeding trough apparatus arranged in a pen area which is demarcated by barrier walls and a floor area of which can be enlarged or reduced by repositioning partition walls or by removing or adding partition walls, and wherein the feeding trough apparatus comprises:
 a trough interior which is accessible to the livestock animals through a trough opening, the trough interior defined at the bottom and laterally by a bottom wall and side walls, respectively, wherein one of the side walls demarcates the trough interior for an access side from which the animals take up feed from the trough interior, the side wall on the access side having an upper side wall edge over which an animal's head must reach at least partly so that the animal can take up feed from the trough interior;
 a trough frame to which the feeding trough is fixed; and
 an adjustment mechanism adapted for adjusting the height of the side wall edge on the access side relative to the trough frame.

* * * * *